US011394709B2

United States Patent
Gomi et al.

(10) Patent No.: US 11,394,709 B2
(45) Date of Patent: Jul. 19, 2022

(54) AUTHENTICATION DEVICE MANAGEMENT DEVICE, AUTHENTICATION DEVICE MANAGEMENT METHOD, NON-TRANSITORY COMPUTER-READABLE RECORDING MEDIUM, AND AUTHENTICATION DEVICE MANAGEMENT SYSTEM

(71) Applicant: Yahoo Japan Corporation, Tokyo (JP)

(72) Inventors: Hidehito Gomi, Tokyo (JP); Shuuji Yamaguchi, Tokyo (JP); Wataru Ogami, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 294 days.

(21) Appl. No.: 16/263,981

(22) Filed: Jan. 31, 2019

(65) Prior Publication Data

US 2019/0268336 A1 Aug. 29, 2019

(30) Foreign Application Priority Data

Feb. 27, 2018 (JP) .............................. JP2018-033887

(51) Int. Cl.
*H04L 9/08* (2006.01)
*H04L 9/32* (2006.01)
(Continued)

(52) U.S. Cl.
CPC ........ *H04L 63/0876* (2013.01); *H04L 9/0819* (2013.01); *H04L 9/0866* (2013.01);
(Continued)

(58) Field of Classification Search
CPC ............. H04L 63/0876; H04L 63/0853; H04L 63/0884; H04L 9/3247; H04L 63/108;
(Continued)

(56) References Cited

U.S. PATENT DOCUMENTS

2015/0304110 A1* 10/2015 Oberheide ............ H04L 9/3247
713/155
2016/0134599 A1* 5/2016 Ross ....................... H04L 63/08
713/168
(Continued)

FOREIGN PATENT DOCUMENTS

JP 2005-260518 A 9/2005
JP 2006-311425 A 11/2006
(Continued)

OTHER PUBLICATIONS

Notice of Reason for Refusal for related Japanese Patent Application No. 2018-033887, dated Jan. 18, 2021; English translation provided (9 pages).

*Primary Examiner* — Fatoumata Traore
*Assistant Examiner* — Hamid Talaminaei
(74) *Attorney, Agent, or Firm* — Procopio, Cory, Hargreaves & Savitch LLP

(57) ABSTRACT

An authentication device management device includes a generating unit, a registration unit, a transmission unit, and a responding unit. The generating unit generates a pair of a first key to attach a signature with respect to an authentication result obtained by an authentication device that performs personal authentication of a user, and a second key to verify the signature attached to the first key. The registration unit registers, in association with each other, the key identifier that identifies the generated key pair and user identification information. The transmission unit transmits the first key generated by the generating unit to the authentication device used by the user. When the responding unit accepts a transmission request for the second key related to the authentication device in which the first key transmitted by the transmission unit has been set, the responding unit
(Continued)

responds by instructing the authentication server to transmit the second key.

12 Claims, 16 Drawing Sheets

(51) Int. Cl.
*H04L 9/40* (2022.01)
*H04W 12/041* (2021.01)
*H04W 12/069* (2021.01)
*H04W 12/0431* (2021.01)

(52) U.S. Cl.
CPC .......... *H04L 9/3247* (2013.01); *H04L 63/062* (2013.01); *H04L 63/0853* (2013.01); *H04L 63/0884* (2013.01); *H04L 63/102* (2013.01); *H04L 63/108* (2013.01); *H04L 63/12* (2013.01)

(58) Field of Classification Search
CPC ... H04L 63/062; H04L 9/0819; H04L 9/0866; H04L 63/102; H04L 63/12; H04L 9/0894; H04L 9/3268; H04W 12/0401; H04W 12/04031; H04W 12/0609
See application file for complete search history.

(56) References Cited

U.S. PATENT DOCUMENTS

| | | |
|---|---|---|
| 2018/0026794 A1 | 1/2018 | Nakano et al. |
| 2018/0167208 A1* | 6/2018 | Le Saint ............... H04L 9/0869 |
| 2018/0183777 A1* | 6/2018 | Guillory ............... H04L 63/061 |

FOREIGN PATENT DOCUMENTS

| | | |
|---|---|---|
| JP | 2006-319410 A | 11/2006 |
| JP | 2017-55384 A | 3/2017 |
| WO | 2016/125553 A1 | 8/2016 |

* cited by examiner

FIG.6

| USER ID | EM-PLOYEE ID | ATTRIBUTE INFORMA-TION | AUTHENTICATION DEVICE INFORMATION ||| ... |
| | | | AUTHENTICA-TION DEVICE | AUTHENTI-CATION METHOD | AUTHENTICATION SOFTWARE | |
|---|---|---|---|---|---|---|
| ... | ... | ... | ... | ... | ... | ... |
| U01 | A01 | B01 | SMARTPHONE 10a | FINGERPRINT, IRIS, FACE, ... | C01 | ... |
| | | | ... | ... | ... | ... |
| U02 | A02 | B02 | TABLET 10b | FINGERPRINT, IRIS, FACE, ... | C02 | ... |
| | | | ... | ... | ... | ... |
| U03 | A03 | B03 | WATCH TYPE TERMINAL 10c | FINGERPRINT | C03 | ... |
| | | | ... | ... | ... | ... |
| ... | ... | ... | ... | ... | ... | ... |

FIG.7

| KEY IDENTIFIER | ASSIGNMENT DESTINATION USER ID | ASSIGNMENT DESTINATION AUTHENTICATION DEVICE | PRIVATE KEY ID | PUBLIC KEY ID | PUBLIC KEY TRANSMISSION DESTINATION | DESIGNATION INFORMATION | | |
|---|---|---|---|---|---|---|---|---|
| | | | | | | VALIDITY PERIOD | AUTHENTICATION METHOD | CRYPTOGRAPHIC ALGORITHM |
| ⋮ | ⋮ | ⋮ | ⋮ | ⋮ | ⋮ | ⋮ | ⋮ | ⋮ |
| KI01 | U01 | SMARTPHONE 10a | KA01 | KB01 | AUTHENTICATION SERVER 50 | - | FINGERPRINT | RSA ENCRYPTION |
| KI02 | U02 | TABLET 10b | KA02 | KB02 | AUTHENTICATION SERVER 50 | - | FINGERPRINT | ELLIPTIC CURVE CRYPTOGRAPHY |
| KI03 | U03 | WATCH TYPE TERMINAL 10c | KA03 | KB03 | AUTHENTICATION SERVER 50 | 2020/1/1 | - | ELLIPTIC CURVE CRYPTOGRAPHY |
| ⋮ | ⋮ | ⋮ | ⋮ | ⋮ | ⋮ | ⋮ | ⋮ | ⋮ |

122

123

| MANAGEMENT POLICY ID | POLICY CONTENT | ... |
|---|---|---|
| ... | ... | ... |
| P01 | PROHIBITION OF AUTHENTICATION EXCEPT DESIGNATED TIME ZONE | ... |
| P02 | REQUESTING TWO-STAGE AUTHENTICATION FOR USERS IN SPECIFIC DEPARTMENT | ... |
| P03 | SEQUENTIALLY UPDATING SOFTWARE | ... |
| P04 | PROHIBITION OF AUTHENTICATION OF TIME-LIMITED EMPLOYEES AFTER THEIR TERMINATION | ... |
| ... | ... | ... |

| PRIVATE KEY ID | KEY IDENTIFIER | VALIDATED AUTHENTICATION METHOD | VALIDATED SERVER | ... |
|---|---|---|---|---|
| ... | ... | ... | ... | ... |
| KA01 | KI01 | FINGERPRINT | AUTHENTICATION SERVER 50 | ... |
| ... | ... | ... | ... | ... |

| VALIDATED AUTHENTICATION DEVICE | USER ID | KEY IDENTIFIER | PUBLIC KEY ID | ... |
|---|---|---|---|---|
| ... | ... | ... | ... | ... |
| SMARTPHONE 10a | U01 | KI01 | KB01 | ... |
| TABLET 10b | U02 | KI02 | KB02 | ... |
| WATCH TYPE TERMINAL 10c | U03 | KI03 | KB03 | ... |
| ... | ... | ... | ... | ... |

AUTHENTICATION DEVICE MANAGEMENT DEVICE, AUTHENTICATION DEVICE MANAGEMENT METHOD, NON-TRANSITORY COMPUTER-READABLE RECORDING MEDIUM, AND AUTHENTICATION DEVICE MANAGEMENT SYSTEM

CROSS-REFERENCE TO RELATED APPLICATION

The present application claims priority to and incorporates by reference the entire contents of Japanese Patent Application No. 2018-033887, filed in Japan on Feb. 27, 2018.

BACKGROUND

1. Field

Example implementations are directed to an authentication device management device, an authentication device management method, a non-transitory computer-readable recording medium having stored therein an authentication device management program (e.g., non-transitory computer readable medium including stored instructions executed by a microprocessor), and an authentication device management system.

2. Related Art

With the popularization of communication networks, related art services via networks are actively provided. For example, a user uses a terminal device and registers authentication information (passwords, etc.) with respect to a service provided via a network. When the user uses the service, the user transmits the registered authentication information and performs authentication request for the identity. Then, the user uses the service by way of authentication of the identity for the service.

From among above described related art technologies related to authentication, there is a related art public key authentication method as a high-security related art method. Furthermore, as a related art public key authentication method, there is a related art technology used to easily perform authentication based on a public key authentication method between user terminals and a large number of service providers by creating a proxy certificate related to a public key in each of the user terminals (for example, refer to JP 2006-311425 A).

However, in the related art technology described above, it is difficult to efficiently manage a plurality of terminals. Specifically, the related art technology described above is related to authentication performed between a single user terminal and a large number of service providers. Thus, the related art technology described above is not able to be used when, for example, a system administrator or the like in a corporation collectively registers, in a server, or collectively manages an authentication setting related to a large number of terminals in their corporation.

SUMMARY

An authentication device management device according to one aspect of the example implementation includes a generating unit that generates a pair of a first key that is used to attach a signature with respect to an authentication result obtained by an authentication device that performs personal authentication of a user and a second key that is used to verify the signature attached by using the first key, a registration unit that registers, in an associated manner, a key identifier that identifies the key pair generated by the generating unit and user identification information that identifies the user, a transmission unit that transmits the first key generated by the generating unit to the authentication device used by the user, and a responding unit that responds, when a transmission request for the second key related to the authentication device in which the first key transmitted by the transmission unit has been set is accepted from an authentication server that verifies the signature, to the transmission request by instructing the authentication server to transmit the second key associated with the authentication device based on the key identifier and the user identification information.

The above and other objects, features, advantages and technical and industrial significance will be better understood by reading the following detailed description of example implementations, when considered in connection with the accompanying drawings.

BRIEF DESCRIPTION OF THE DRAWINGS

FIG. 6 is a diagram illustrating an example of a user information storage unit according to the example implementation;

FIG. 7 is a diagram illustrating an example of a key information storage unit according to the example implementation;

FIG. 12 is a diagram illustrating an example of an authentication device information storage unit according to the example implementation;

DETAILED DESCRIPTION

Figure 1:
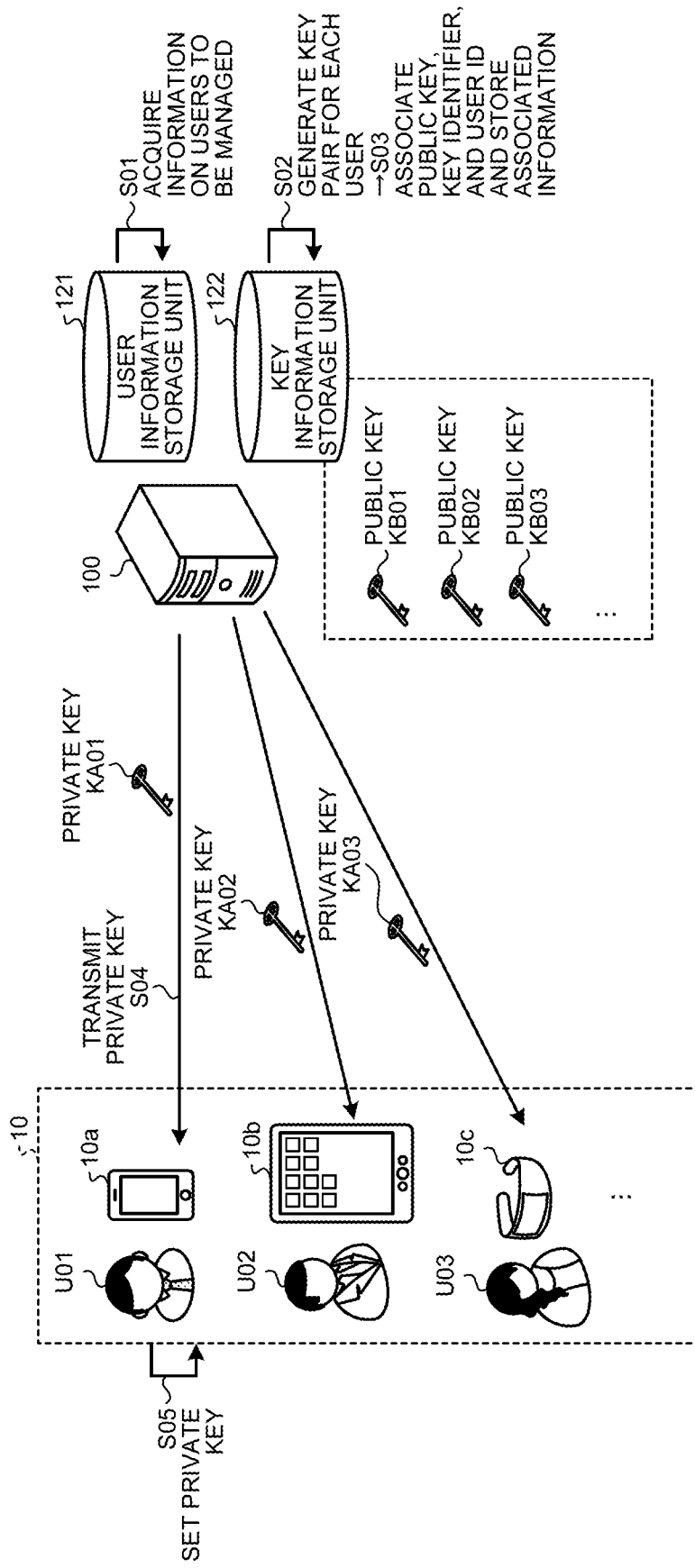
FIG. 1 is a diagram (1) illustrating an example of an authentication device management process according to an example implementation.

A mode (hereinafter, referred to as an "embodiment" or "example implementation") for carrying out an authentication device management device, an authentication device management method, a non-transitory computer-readable recording medium having stored therein an authentication device management program (e.g., non-transitory computer readable medium including stored instructions executed by a microprocessor), and an authentication device management system according to the present application will be described in detail below with reference to the accompanying drawings. The authentication device management device, the authentication device management method, the non-transitory computer-readable recording medium having stored therein the authentication device management program (e.g., non-transitory computer readable medium including stored instructions executed by a microprocessor), and the authentication device management system according to the present application are not limited by the example implementation. Furthermore, each of the example implementations can be appropriately used in combination as long as the content of processes does not conflict with each other. Furthermore, in the example implementations below, the same components are denoted by the same reference numerals and an overlapping description will be omitted.

1. Example of an Authentication Device Management Process

First, the example of an authentication device management process according to an example implementation will be described with reference to FIG. 1 and FIG. 2. FIG. 1 is a diagram (1) illustrating an example of the authentication device management process according to an example implementation. FIG. 1 illustrates an example of a process in which a plurality of authentication devices is managed by an authentication device management device 100.

The authentication device management device 100 illustrated in FIG. 1 is a server device that manages authentication devices. In the example implementation, each of the authentication devices is an apparatus that performs an authentication process with respect to users ("authentication device" is also called "authenticator"). The authentication process performed with respect to users mentioned here is a process that uses, for example, biometric information, such as a fingerprint or an iris, or credential information, such as a password, and verifies whether the user is the person in question. Namely, each of the authentication devices herein is an apparatus having a function for determining the authenticity of the fingerprint, the iris, or the like described above, and verifying the identity of the subject user. The authentication device may also be, for example, a dedicated apparatus, such as a fingerprint collator, or a terminal device (smartphone, etc.) in which an application or the like having a function of the authentication process is installed. Furthermore, the authentication device mentioned here may include an application having a function of the authentication process.

In the example illustrated in FIG. 1, the authentication devices are various devices, such as a smartphone 10a used by a user U01, a tablet 10b used by a user U02, and a watch type terminal 10c used by a user U03. Furthermore, as disclosed herein, these devices may be collectively referred to as a "user terminal 10" when each of the various devices does not need to be distinguished. Furthermore, the users mentioned above may be collectively referred to as a "user" when each of the users does not need to be distinguished. Furthermore, in the descriptions below, the user terminal 10 or the authentication device is sometimes read as a "user". For example, in a case where a description in which "the authentication device management device 100 transmits information to the user U01" sometimes refers to "the authentication device management device 100 transmits information to the user terminal 10 (authentication device) that is used by the user U01.

Authentication Method According to the Example Implementation

In the following, before descriptions of FIG. 1 and FIG. 2, a process in which the authentication device according to the example implementation authenticates a user and an authentication method for verifying an authentication result obtained by the authentication device will be described in detail with reference to FIG. 3. FIG. 3 is a sequence diagram illustrating an authentication method according to the example implementation. In FIG. 3, a description will be given of the flow of the authentication process performed by the authentication device (referred to as a "client 20" in FIG. 3 in distinction) by using, as an example, a state in which a user uses a service (for example, a service or the like in which some function is limited unless personal authentication is completed) with a limited access provided by a service server 60.

In general, when a server authenticates a client, the server side holds credential information that is previously registered and then performs authentication based on checking the held information against the credential information that is transmitted from the client at the time of authentication.

However, in the example implementation, as will be described below, a method that is different from a general authentication process is used. Specifically, in the example implementation, a client 20 authenticates, locally, the identity of a user and transmits only the obtained result of authentication to the service server 60. The service server 60 authenticates the client 20 (in other words, the user who uses the client 20) by verifying the result indicating that the transmitted authentication result has been subjected to the authentication process performed by the client 20.

Furthermore, the authentication performed locally is an authentication performed in a state in which connection of a wide area network (e.g., external network), such as the Internet, is not needed and is authentication performed by using, for example, a function provided inside the client 20. The client 20 previously accepts registration, from a user, information, such as biometric information on the user, that can be used to authenticate the subject user. Then, the client 20 accepts, at the time of authentication, an input of the biometric information or the like from the user and performs personal authentication based on the check result obtained by checking the registration data against the input data. An example of a method for performing personal authentication includes fingerprint authentication, iris authentication, voiceprint authentication, and the like. Furthermore, the authentication process may also be implemented by software installed in the client 20 or may also be implemented by hardware that is present within a region connected to the client 20 by a local area network (LAN) or the like. Namely, the authentication process performed by the client 20 may also include authentication performed by using hardware or the like that does not use an external network, such as the Internet, and that cooperates with the client 20 by the hardware being directly connected to an interface provided, for example, in the client 20. In this way, the authentication device mentioned here can be read as authentication function that functions on the client 20 side or can be read as an authentication method or device as disclosed herein.

First, as the flow of a process in which the service server 60 registers the client 20 as the authentication target, the processes performed at S21 to S26 illustrated in FIG. 3 will be described. Namely, S21 to S26 illustrated in FIG. 3 indicates, before the actual authentication process performed when a service is used, the flow of the process in which the service server 60 registers the client 20 as an authentication device.

The client 20 accesses the service server 60 and requests for registration of the authentication device (S21). The service server 60 responds to the request transmitted from the client 20 and requests authentication for registration of the client 20 (S22). Specifically, the service server 60 transmits, to the client 20 that has requested registration, a random character string referred to as a challenge.

The client 20 responds to the authentication request received from the service server 60, performs the authentication, and performs, locally, authentication of the user (S23). For example, if the user selects fingerprint authentication as the authentication method for the performing the authentication function, the user performs the authentication process by holding a finger over an input portion of fingerprint data. Furthermore, it is understood that the fingerprint data (e.g., correct data) of the user is previously registered in the client 20 by the user or is registered at the time at which the process at S23 is performed.

By checking the correct data stored in the client 20 against the input data, the client 20 can confirm that the user is a normal user, the client 20 issues a public key and a private key associated with the subject authentication process (S24). Then, the client 20 stores the issued private key inside the client 20 and generates a signature with respect to the challenge that was previously received by using the subject private key. Then, the client 20 transmits the public key that is paired with the private key to the service server 60 as well as the generated challenge to which the signature is attached (S25). The service server 60 receives the public key from the client 20 and stores the public key in association with the client 20 (S26). The private key inside the client 20 is stored in the storage area in which, in principle, an access is not accepted and it is understood that an access is not permitted as long as authentication performed locally is successful. Consequently, registration related to the client 20 in the service server 60 has been completed.

Subsequently, a state in which, after the registration of the client 20 has been completed, the user attempts to use the service and actually accesses the service server 60 will be described in accordance with the process performed at S31 to S37 illustrated in FIG. 3.

The client 20 requests the service server 60 to access a service with a limited access (e.g., predetermined) (S31). Furthermore, such a request may also be transmitted via, for example, a web server or the like that provides a service via a network. Namely, in the course of using the service, the user sometimes receives a request for personal authentication from the web server located at the connection destination. In this case, if the user declares to perform personal authentication, the subject information is transmitted to the service server 60 from the client 20 or from the web server located at the connection destination.

The service server 60 that has accepted the request issues a challenge (random character string) to the client 20 and requests authentication of the user (S32). The user of the client 20 that has accepted the request performs local authentication by using the same method as that used at the time of registration (S33).

If the authentication has been successful, i.e., if identity has been confirmed in the local, the client 20 can access the private key stored in the storage area inside the own device. Then, by using the private key that can be accessed only by the user who has been recognized as a normal user, the client 20 generates a signature (hash value) with respect to the information related to the result of the authentication including the challenge. In other words, the client 20 generates, by using the private key, information with the signature attached (S34). Furthermore, in a description below, the information that was generated by using a private key with a signature attached and that indicates the authentication result of the user is sometimes referred to as "authentication result information".

Subsequently, the client 20 transmits the authentication result information generated by using a communication method (details will be described later) prescribed with the service server 60 (S35). The service server 60 verifies, by using the public key that is paired with the private key, the signature attached to the transmitted authentication result information including the challenge (S36). Namely, the service server 60 verifies that no falsification is present in the authentication result information, in other words, verifies whether the authentication result information has been generated by an appropriate private key. In this way, the service server 60 verifies that the client 20 that is the authentication device holds an appropriate private key. If the verification has been completed, the service server 60 authenticates that the user who uses the client 20 is a normal user. Then, the service server 60 transmits, to the client 20, information indicating that the service server 60 by itself has authenticated the client 20 (S37). The information in which authentication has been performed mentioned here corresponds to, for example, an authentication cookie or the like.

As described above, according to the authentication method described above, the client 20 does not transmit, to the network, the credential information itself used for authentication, such as biometric information, passwords, or service IDs, that is often used for general authentication. Namely, the information (authentication result information) to be transmitted from the client 20 to the service server 60 is merely information indicating the authentication result obtained in the local and, even if a third party intercepts the information transmitted from the client 20, the third party is not able to use the information. Consequently, it can be said that the authentication method according to the example implementation is a high-security method when compared with a general authentication method. Furthermore, according to the authentication method that is used by the service server 60, because a user does not need to store a password, it is possible to reduce the load applied to the user.

Furthermore, as described above, in the process of authentication result information transmitted from the client 20, the service server 60 may also use a specific communication method prescribed with the client 20. The specific communication method mentioned here is an authentication procedure prescribed between the service server 60 and the client 20 and can be read as the protocol related to communication.

For example, the service server 60 uses the protocol, such as the universal authentication framework (UAF), the universal second factor (U2F), or the like. Consequently, it is possible to ensure the higher security of communication between the service server 60 and the client 20.

As described with reference to FIG. 3, if communication using the authentication method based on the public key encryption method using a specific protocol is established between the service server 60 and the client 20 (authentication device), the client 20 can perform personal authentication with respect to the service server 60 without transmitting the authentication information itself, such as a password, to the network.

As described above, in the method illustrated in FIG. 3, a pair of keys is issued inside the client 20 at the time of the registration process and the issued keys are transmitted to the service server 60. Namely, when the user who uses the service attempts to use the service in a plurality of devices, the user needs to perform registration at each device (e.g., authentication device). Thus, for example, if a shared server in a corporation corresponds to the service server 60 and the client 20 corresponds to a device that is used by an employee working in the subject corporation, the system administrator in the corporation needs to individually register all of the devices, resulting in an increase in a working load. Furthermore, if each of the clients 20 individually performs registration with respect to the service server 60, it is difficult for the system administrator in the corporation to perform management of, for example, collectively or individually setting an access permission period of the client 20 to the service server 60 or terminating an access authority. Namely, when using the related art authentication method, there is a problem in that it is difficult to manage a plurality of terminals.

Thus, the authentication device management device 100 according to the present application can collectively manage a plurality of authentication devices by performing the process described below. Consequently, the authentication device management device 100 reduces complicated related art efforts, such as registration and management of the plurality of terminals. In the following, a description will be given here by referring back to FIG. 1 and FIG. 2, an example of the authentication device management process performed by the authentication device management device 100 will be described in accordance with the flow of the process.

Setting Process of a Private Key According to the Example Implementation

As illustrated in FIG. 1, the authentication device management device 100 acquires information on the users to be managed (S01). For example, the authentication device management device 100 acquires, in response to an input of information from an administrator or the like who manages the system used in the corporation, the information on the managed users. The authentication device management device 100 acquires information on, for example, attribute information on each of the users (information on gender, age, title in the corporation, information whether the user is a time-limited employee, etc.), the type of authentication devices arranged for each of the users. The authentication device management device 100 stores the acquired information related to the users in a user information storage unit 121.

Then, the authentication device management device 100 generates a key pair for each user (S02). In the example illustrated in FIG. 1, the authentication device management device 100 generates, as the keys associated with the smartphone 10a used by the user U01, a pair of a private key KA01 and a public key KB01. Furthermore, the authentication device management device 100 generates, as the keys associated with the tablet 10b used by the user U02, a pair of a private key KA02 and a public key KB02. Furthermore, the authentication device management device 100 generates, as the keys associated with the watch type terminal 10c used by the user U03, a pair of a private key KA03 and a public key KB03.

At the time of the process of generating the key pairs, the authentication device management device 100 issues a key identifier that is information for identifying the key to be generated and issues the user ID that is identification information used to identify the user to whom the key is assigned. Then, the authentication device management device 100 associates the public key that is one of the keys generated as the key pair, the key identifier, and the user ID and stores the associated information in a key information storage unit 122 (S03). Furthermore, the key identifier may also include a key ID (ID) that identifies the key itself and may also include an Authenticator Attestation ID (AAID) that Identifies an Authentication Device.

Then, the authentication device management device 100 transmits the private key that is one of the keys generated as the key pair and that is to be assigned to each of the users to the corresponding users (S04). For example, the authentication device management device 100 transmits the private key KA01 to the user U01. Similarly, the authentication device management device 100 transmits the private key KA02 to the user U02 and transmits the private key KA03 to the user U03. Furthermore, the authentication device management device 100 may also transmit, together with each of the private keys, control information that is used to set the private key in each of the authentication devices. The control information may also be, for example, a script (e.g., predetermined) that is used to allow the private key to be used in each of the authentication devices or may also be a dedicated application (program (e.g., non-transitory computer readable medium including stored instructions executed by a microprocessor)) or the like. Furthermore, the control information may also be a control policy that is attached to the script or the application and that is described in a policy language (e.g., predetermined).

The user U01 to whom the private key KA01 has been assigned operates the smartphone 10a and performs setting for using the private key KA01 (S05). Specifically, the user U01 sets, in the smartphone 10a, the authentication method for authenticating the identity of the user. Such an authentication method may also be designated by the authentication device management device 100 or may also be, if designation is not received from the authentication device management device 100, arbitrarily selected by the user U01. Furthermore, the authentication method may also be selected in accordance with the function included in the authentication device. For example, if the smartphone 10a has a function of fingerprint authentication, the user U01 may also select "fingerprint" as the authentication method.

Specifically, the user U01 starts up the function related to authentication of the smartphone 10a and registers the own fingerprint data. In this case, if authentication is needed next time and subsequent time, the user U01 holds the own fingerprint over an input unit (for example, a screen with touch panel, etc.) in the smartphone 10a and allows the smartphone 10a to be authenticated that the user itself is the user U01. If registration as described above has been performed, the smartphone 10a holds the private key KA01 in a secure storage area in the smartphone 10a. Consequently, setting of the private key KA01 in the smartphone 10a is completed. Namely, when the smartphone 10a authenticates the user U01 in the local next time and subsequent time, the smartphone 10a can generate the authentication result information by attaching a signature with respect to the authentication result by using the private key KA01. The smartphone 10a transmits information indicating that the setting of the private key KA01 has been completed to the authentication device management device 100. The user U02 and the user U03 also similarly perform the setting of the private key KA02 and the private key KA03, respectively. Consequently, assignment of the private key performed by the authentication device management device 100 has been completed.

Furthermore, the smartphone 10a does not always need to accept registration of a fingerprint or the like from the user U01 at S05. For example, the smartphone 10a receives the private key KA01 at S05 and holds the received private key KA01 in the storage area. Then, the smartphone 10a may also register the fingerprint or the like for the first time when the smartphone 10a performs the authentication process with respect to the user U01 at S11, which will be described later, illustrated in FIG. 2.

Registration Process Performed by the Authentication Device According to the Example Implementation In the following, the flow of the process in which a server (an authentication server 50 in the example illustrated in FIG. 2) that provides services or the like to users registers the user terminal 10, in which the private key has been assigned, as an authentication device will be described with reference to FIG. 2. In other words, FIG. 2 illustrates the flow of the process performed to validate the authentication device (and the key pair generated by the authentication device management device 100) with respect to the authentication server 50. FIG. 2 is a diagram (2) illustrating an example of the authentication device management process according to the example implementation.

Figure 2:
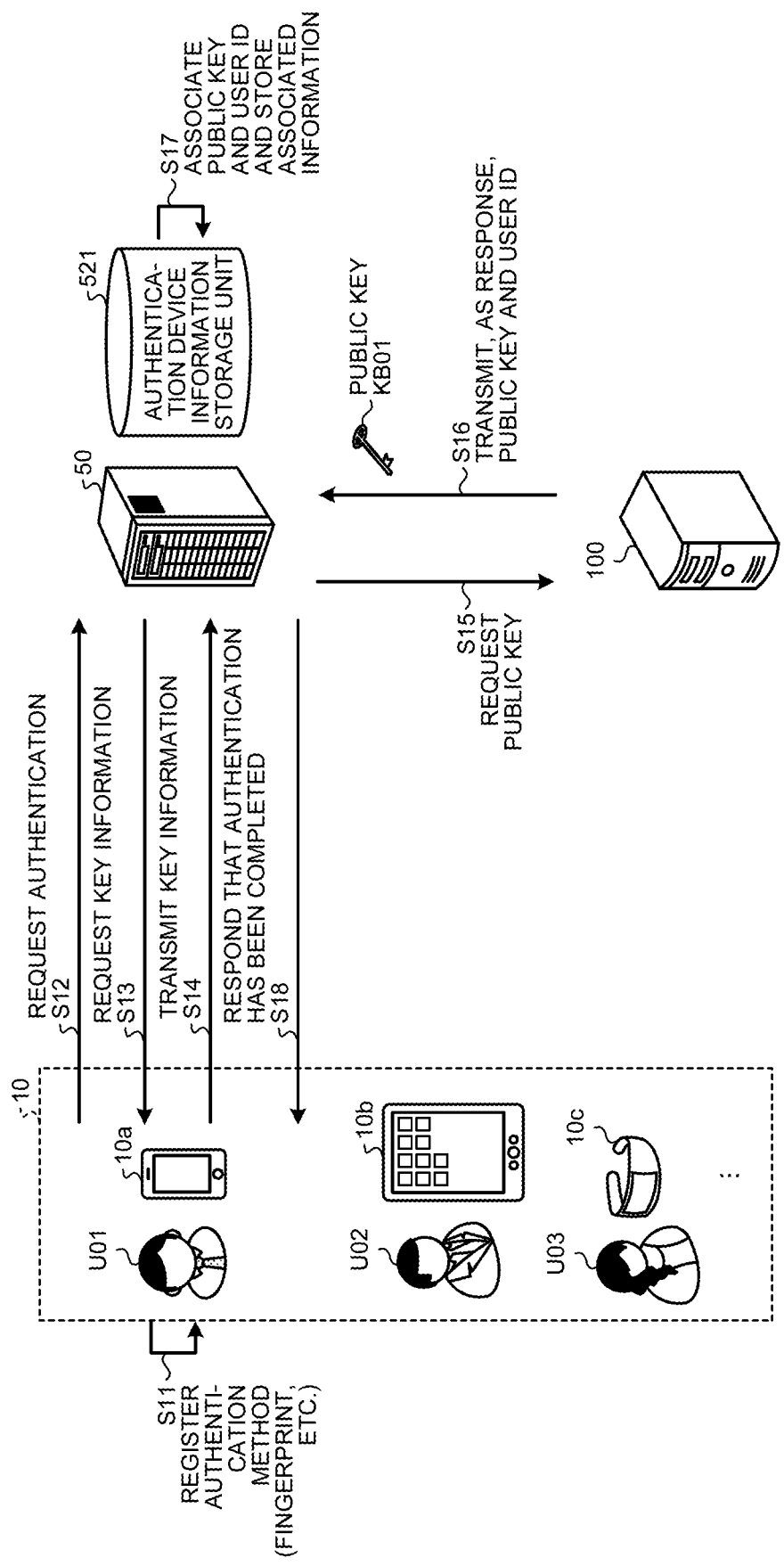
FIG. 2 is a diagram (2) illustrating an example of the authentication device management process according to the example implementation.
Figure 3:
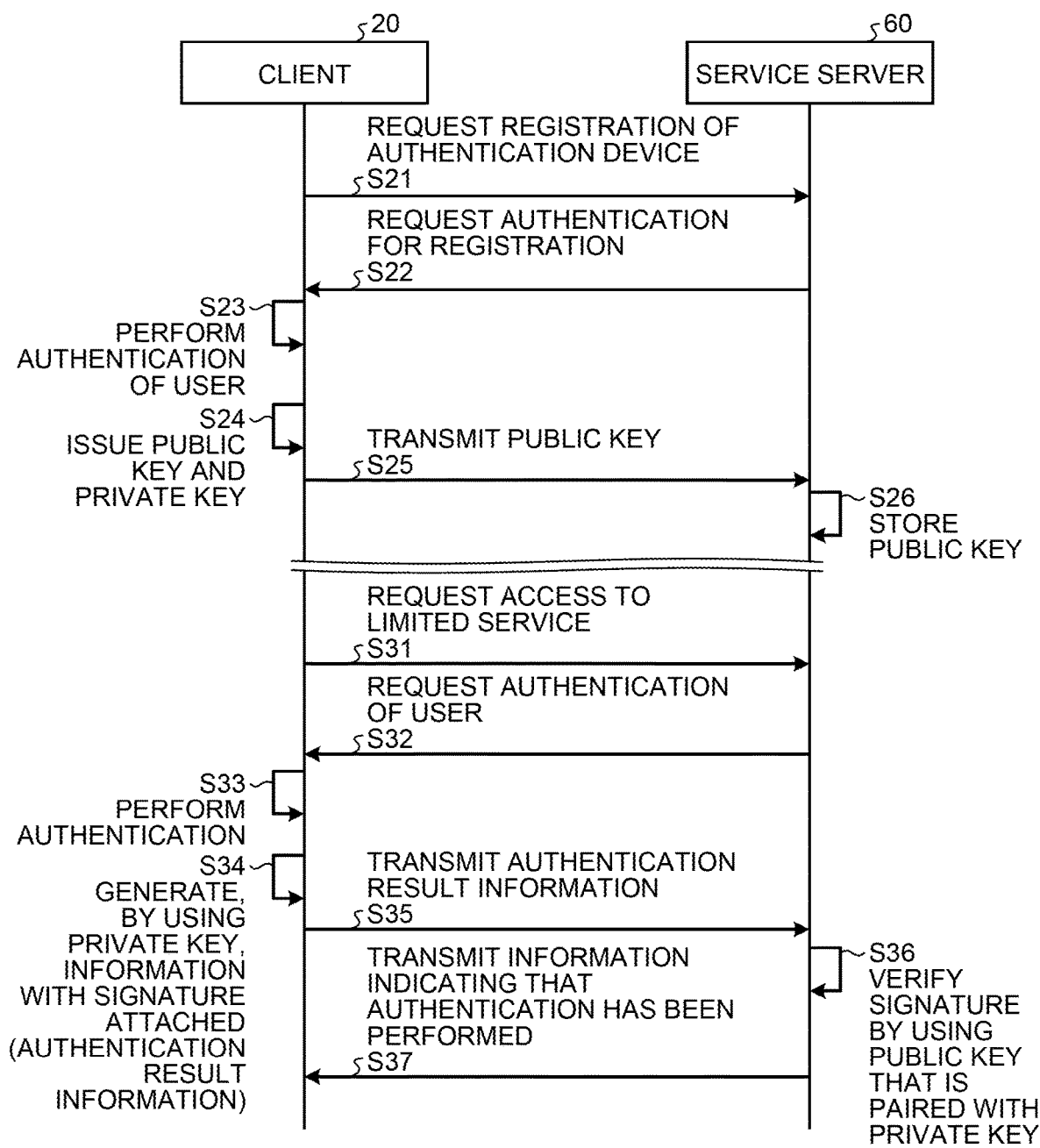
FIG. 3 is a sequence diagram illustrating an authentication method according to the example implementation.

As illustrated in FIG. 2, the user U01 registers the authentication method (fingerprint, etc.) in the smartphone 10a (S11). The procedure of the process at S11 is performed in the same manner as that performed at, for example, S05 illustrated in FIG. 1. After the registration, as a trigger, the smartphone 10a transmits an authentication request to the authentication server 50 (S12). Furthermore, the process of transmitting the authentication request performed when, as a trigger, the authentication method has been registered may also be performed by controlling the smartphone 10a by, for example, the control information (script) or the like transmitted from the authentication device management device 100 when the private key KA01 is transmitted. In this case, in the control information, information for, for example, specifying the transmission destination target (the authentication server 50 in the example illustrated in FIG. 2) to which the authentication request is transmitted is included.

The authentication server 50 that has received the authentication request transmits, as a response, a request for the key information to the smartphone 10a (S13). The key information mentioned here is information for specifying the key assigned to the smartphone 10a and is, specifically, a key identifier associated with the private key KA01. In response to the request, the user U01 transmits, to the authentication server 50, the key information including the key identifier associated with the private key KA01 that has been assigned to the user U01 (S14).

The authentication server 50 that has received the key identifier requests, based on the key identifier, the authentication device management device 100 to transmit a public key (S15). The authentication device management device 100 specifies, based on the key identifier, a public key and specifies the user ID associated with the key identifier. Then, the authentication device management device 100 responds to the request by instructing the authentication server 50 to transmit the specified public key (the public key KB01 in the example illustrated in FIG. 2) and the user ID (S16).

The authentication server 50 associates the authentication device (e.g., the smartphone 10a in the example illustrated in FIG. 2), the public key KB01 received from the authentication device management device 100, and the user ID and stores the associated information in an authentication device information storage unit 521 (S17). Then, the authentication server 50 transmits, as a response, information indicating the completion of authentication to the smartphone 10a (S18).

The completion of authentication indicates that the smartphone 10a has been registered as a valid authentication device that can be used for authentication with respect to the authentication server 50. In other words, the completion of authentication indicates that the smartphone 10a in which the private key KA01 has been assigned has been validated as the authentication device. Although not illustrated in FIG. 2, the same process as that performed on user U01 is also performed on the user U02 and the user U03 and then the tablet 10b and the watch type terminal 10c are allowed to be validated as the authentication devices. Consequently, after this, the smartphone 10a, the tablet 10b, and the watch type terminal 10c can perform the authentication process, in which personal authentication can be received from the authentication server 50 without transmitting the authentication information itself, such as fingerprint data, illustrated in FIG. 3.

As described in FIG. 1 and FIG. 2, the authentication device management device 100 according to the example implementation generates a pair of a private key that is used to attach a signature with respect to the authentication result obtained by the authentication device that performs personal authentication of a user and a public key that is used to verify the signature attached by using the private key. Furthermore, the authentication device management device 100 associates the key identifier that identifies the generated key pair with the user ID that identifies a user and stores the associated information in the key information storage unit 122. Subsequently, the authentication device management device 100 transmits the generated private key to the authentication device that is used by the user. Thereafter, if the authentication device management device 100 accepts, from the authentication server 50 that verifies the signature, a transmission request for the public key related to the authentication device in which the transmitted private key has been set, the authentication device management device 100 responds to the transmission request by instructing the authentication server 50 to transmit the public key associated with the subject authentication device based on the key identifier and the user ID.

In this way, the authentication device management device 100 according to the example implementation generates, instead of the authentication device, the key pairs used in the authentication method that uses the public key encryption method described above. Then, the authentication device management device 100 assigns the generated keys to the corresponding authentication devices. Consequently, the authentication device management device 100 can collectively manage the key identifiers and the user IDs that are usually held by the individual authentication devices. Thus, the authentication device management device 100 can perform collective management, such as collectively managing the validity of the assigned keys; assigning a key, in which a period of use is previously limited, to a specific user; or terminating a key of a user retired from a corporation. For example, the authentication device management device 100 may also previously generate a management policy or the like in which a management process is prescribed and perform management conforming to the management policy.

Furthermore, although described later in detail, by performing the process of generating a key by the own device instead of the authentication device, the authentication device management device 100 can thus also collectively perform a process of, for example, arbitrarily setting a cryptographic algorithm when the keys are generated or updating software used for authentication. In this way, the authentication device management device 100 according to the example implementation can efficiently perform management by generating, by the own device, the keys to be assigned to a plurality of terminals (authentication devices) and by managing the plurality of terminals based on the generated keys. In the following, the authentication device management device 100 according to the example implementation and an authentication device management system 1 that includes the authentication device management device 100 according to the example implementation will be described in detail.

2. Configuration of the Authentication Device Management System

Figure 4:
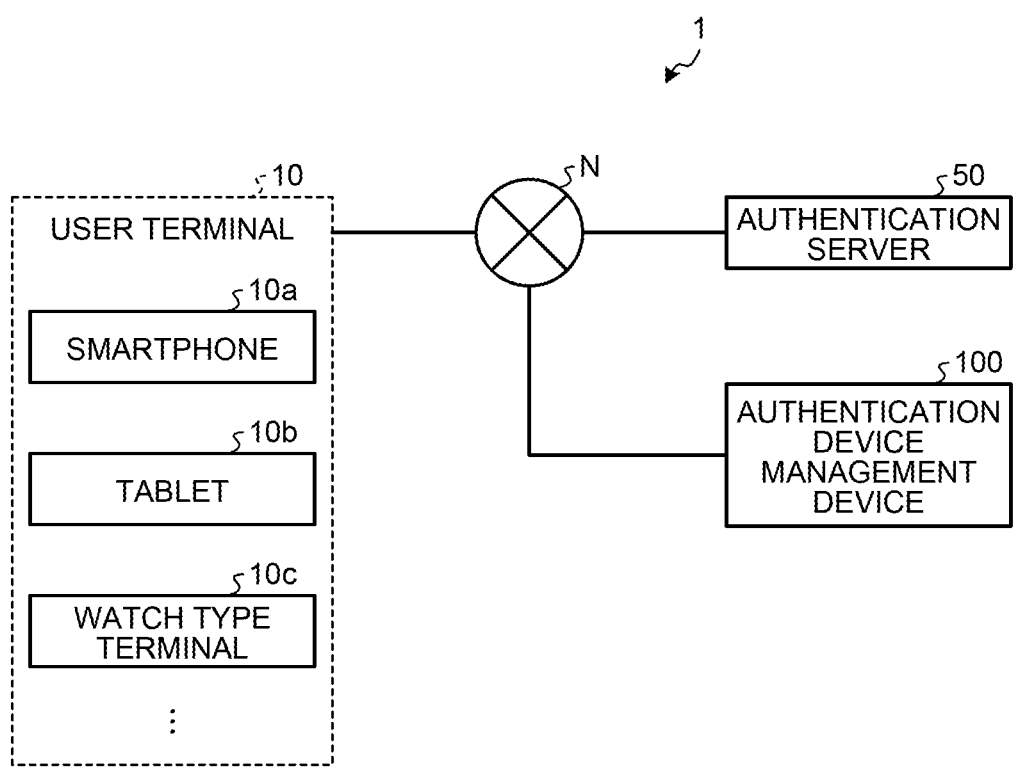
FIG. 4 is a diagram illustrating a configuration example of an authentication device management system according to the example implementation.

In the following, a configuration of the authentication device management system 1 in which the authentication device management device 100 according to the example implementation is included will be described with reference to FIG. 4. FIG. 4 is a diagram illustrating the configuration example of the authentication device management system 1 according to the example implementation. As an example illustrated in FIG. 4, in the authentication device management system 1 according to the example implementation, the user terminal 10, the authentication server 50, and the authentication device management device 100 are included. In the user terminal 10, for example, the smartphone 10a, the tablet 10b, the watch type terminal 10c, and the like are included. These various devices are connected via a network N such that the devices can perform communication in a wired or a wireless manner.

The user terminal 10 is, for example, an information processing terminal (e.g., device), such as a desktop personal computer (PC), a notebook PC, a tablet terminal, and a mobile phone including a smartphone, or a personal digital assistant (PDA). The user terminal 10 functions as the authentication device according to the example implementation. Furthermore, an example of the user terminal 10 may also include a wearable device, such as a watch type terminal, an eyeglass type terminal. Furthermore, an example of the user terminal 10 may also include various kinds of smart devices each having an information processing function. For example, an example of the user terminal 10 may also include a smart home appliance, such as a television (TV), a smart vehicle, such as an automobile, a drone, a home robot, or the like.

The authentication server 50 is a server device that authenticates the identity of the user based on the authentication result information transmitted from the authentication device. For example, the authentication server 50 is a service server that provides various services to users, is a shared server or the like installed in a corporation, or is a front end server or the like that authenticates users who access the service server or the shared server and that ensures the security.

The authentication device management device 100 is a server device that generates, as described above, both a private key that is used to attach a signature with respect to the result of the authentication process performed by the authentication device and a public key that is paired with the private key and that assigns the generated key to the authentication device. Furthermore, the authentication device management device 100 manages the validity of the key assigned to the authentication device by specifying each of the authentication devices by using the user IDs and the key identifiers.

Furthermore, the authentication device management device 100 may have the function of the authentication server 50. Namely, the authentication device management device 100 and the authentication server 50 may also be an integrated server.

3. Configuration of the Authentication Device Management Device

Figure 5:
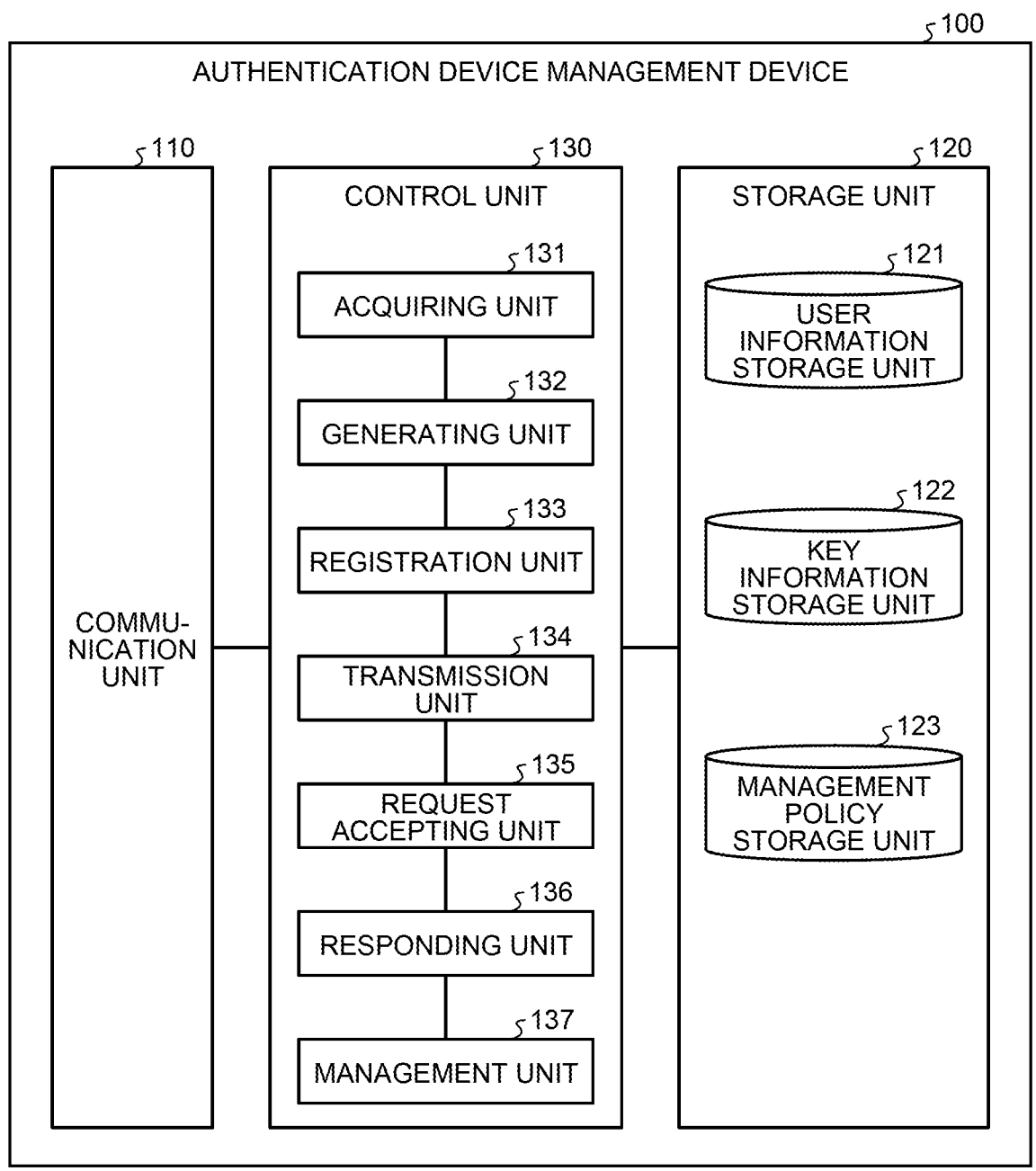
FIG. 5 is a diagram illustrating a configuration example of an authentication device management device according to the example implementation.

In the following, a configuration of the authentication device management device 100 according to the example implementation will be described with reference to FIG. 5. FIG. 5 is a diagram illustrating the configuration example of the authentication device management device 100 according to the example implementation. As illustrated in FIG. 5, the authentication device management device 100 includes a communication unit 110, a storage unit 120, and a control unit 130. Furthermore, the authentication device management device 100 may also include an input unit (for example, a keyboard, a mouse, etc.) that receives various operations from an administrator or the like who uses the authentication device management device 100 and may also include a display unit (for example, a liquid crystal display, etc.) that is used to display various kinds of information.

Communication Unit 110

The communication unit 110 is implemented by, for example, a network interface card (NIC), or the like. The communication unit 110 is connected to the network N in a wired or wireless manner and transmits and receives information to and from the user terminal 10 or the authentication server 50.

Storage Unit 120

The storage unit 120 is implemented by, for example, a semiconductor memory device, such as a random access memory (RAM) or a flash memory, or a storage device, such as a hard disk or an optical disk. The storage unit 120 includes the user information storage unit 121, the key information storage unit 122, and a management policy storage unit 123.

User Information Storage Unit 121

The user information storage unit 121 stores therein information related to users who use the authentication devices. Here, an example of the user information storage unit 121 according to the example implementation is illustrated in FIG. 6. FIG. 6 is a diagram illustrating an example of the user information storage unit 121 according to the example implementation. In the example illustrated in FIG. 6, the user information storage unit 121 has items, such as "user ID", "employee ID", "attribute information", "authentication device information", and the like. Furthermore, the item of the authentication device information has sub items, such as "authentication device", "authentication method", "authentication software", and the like.

The "user ID" indicates identification information for identifying a user. Furthermore, in the example implementation, the identification information, such as a user ID, is sometimes used as a reference numeral. For example, if a user having the user ID of "U01" indicates the "user U01".

The "employee ID" is the identification information assigned to each employee when a user is an employee in a corporation. The "attribute information" indicates the attribute information on a user. In the example illustrated in FIG. 6, the attribute information is represented by the concept, such as "B01"; however, in practice, in the item of the attribute information, various kinds of specific attribute information on a user, such as the title of the user in the corporation, the period of time contracted as an employee, gender, and age, may be stored.

The "authentication device information" indicates the information related to the authentication device used by a user. The "authentication device" indicates the name or the model name of the authentication device used by the user. Furthermore, in the item of the authentication device, the identification information for identifying an authentication device may also be stored. The "authentication method" indicates the means (e.g., function) of authentication that is included in the corresponding structure (method) of the authentication device and that can perform personal authentication of the user. The "authentication software" indicates software used for the authentication process performed by the authentication device. In the example illustrated in FIG. 6, the authentication software is represented by the concept, such as "C01"; however, in practice, in the item of the authentication software, specific information, such as the name of authentication software or version information on the authentication software is stored.

Namely, FIG. 6 indicates that, as an example of the information stored in the user information storage unit 121, the user U01 identified by the user ID "U01" is an employee identified by the employee ID "A01" and indicates that the attribute information thereof is "B01". Furthermore, FIG. 6 indicates that the authentication device used by the user U01 is the "smartphone 10a" and the authentication method or process thereof is "fingerprint, iris, face, and indicates that the authentication software is "C01".

Key Information Storage Unit 122

The key information storage unit 122 stores the information related to the key generated by the authentication device management device 100. Here, an example of the key information storage unit 122 according to the example implementation is illustrated in FIG. 7. FIG. 7 is a diagram illustrating an example of the key information storage unit 122 according to the example implementation. In the example illustrated in FIG. 7, the key information storage unit 122 has items, such as "key identifier", "assignment destination user ID", "assignment destination authentication device", "private key ID", "public key ID", "public key transmission destination", "designation information", and the like. Furthermore, the item of the designation information has sub items, such as "validity period", "authentication method", "cryptographic algorithm", and the like.

The "key identifier" is an identifier that is used to specify the generated key pair. The "assignment destination user ID" is identification information for identifying a user to whom the key has been assigned. Furthermore, the information indicated by the assignment destination user ID is common to the "user ID" illustrated in FIG. 6. The "assignment destination authentication device" indicates the authentication device in which the key has been assigned.

The "private key ID" indicates the identification information for identifying a private key. The "public key ID" indicates the identification information for identifying a public key. The "public key transmission destination" indicates the destination in which the public key paired to the private key assigned to the authentication device has been transmitted. For example, the destination corresponds to the server device or the like that verifies the authentication result information.

The "designation information" is information that is set in a private key or a public key and indicates various kinds of information designated by an administrator or the like designated by the authentication device management device 100. The "validity period" indicates the period for which the private key and the public key are valid. The valid period is a period for which authentication of the user can be perform by using the private key and the public key. Furthermore, if the validity period is not designated, the item of the "validity period" is blank.

The "authentication method" indicates the designated authentication method (e.g., authentication function or authentication structure). For example, the user to whom the key in which the authentication method has been designated has been assigned needs to validate the authentication device by using the designated authentication method. Furthermore, if the authentication method is not designated, the item of the authentication method is blank. If the authentication method is not designated, the user can validate the authentication device by another method or structure.

The "cryptographic algorithm" indicates the cryptographic algorithm used when a key is generated. For example, by using a different cryptographic algorithm for each user, the authentication device management device 100 can prevent a situation in which a large number of keys are generated by a single common cryptographic algorithm, thereby it is possible to improve the security of the entire enterprise.

Namely, FIG. 7 indicates that, as an example of the information stored in the key information storage unit 122, the user in which the key identified by the key identifier "KI01" is to be assigned is the user U01 identified by the user ID "U01" and indicates that the subject authentication device is the "smartphone 10a". Furthermore, FIG. 7 indicates that the private key assigned to the user U01 is the private key KA01 identified by the private key ID "KA01", indicates that the public key paired with the private key is the public key KB01 identified by the public key ID "KB01", and indicates that the destination of the public key KB01 is the "authentication server 50". Furthermore, FIG. 7 indicates that, as the information designated to the key identified by the key identifier "KI01", the validity period is not designated, the designation of the authentication method is "fingerprint", and the cryptographic algorithm for generating the key is "RSA encryption".

Management Policy Storage Unit 123

Figure 8:
FIG. 8 is a diagram illustrating an example of a management policy storage unit according to the example implementation.

The management policy storage unit 123 stores therein a policy that manages a user (e.g., authentication device). Here, FIG. 8 illustrates an example of the management policy storage unit 123 according to the example implementation. FIG. 8 is a diagram illustrating an example of the management policy storage unit 123 according to the example implementation. In the example illustrated in FIG. 8, the management policy storage unit 123 has items, such as "management policy ID", "policy content", and the like.

The "management policy ID" indicates the identification information for identifying the management policy. The "policy content" indicates specific content of the management policy. For example, the management policy is set by an administrator or the like in a corporation. The authentication device management device 100 performs control of a private key or a public key in accordance with the content that has been set as the management policy. For example, if, as the management policy, the content indicating that "authentication process performed from 10:00 p.m. to 5:00 a.m. is prohibited" is prescribed, the authentication device management device 100 treats the authentication process to be processed in the subject period of time as an invalid process in accordance with the management policy. Specifically, the authentication device management device 100 specifies, based on the key identifier, the authentication device in which the private key has been assigned and disables the authentication process to be performed by the subject authentication device during the subject period of time or disables the process of verifying the authentication result information performed by the authentication server 50 by using the public key.

Namely, FIG. 8 indicates that, as an example of the information stored in the management policy storage unit 123, the management content indicating "prohibition of authentication except the designated time zone" is set in the management policy P01 identified by the management policy ID "P01".

Furthermore, FIG. 8 indicates that the management content indicating "requesting a two-stage authentication for users in a specific department" is set in the management policy P02. This indicates that, for example, when a user in a specific department validates the authentication device or when a user actually performs authentication, a multi-stage, such as two-stage, authentication, such as both a fingerprint and a password, is requested. In this case, for example, when the authentication device management device 100 assigns a key to the user in the specific department prescribed in the management policy P02, the authentication device management device 100 assigns the key to the user after writing information indicating the "two-stage authentication" in the authentication method as the designation information.

Furthermore, FIG. 8 indicates that the management content indicating "sequentially updating software" is set in the management policy P03. This indicates that, if the authentication software is updated after a key has been assigned, information indicating that the authentication device management device 100 specifies an authentication device by using a key identifier and sequentially updates the authentication software is prescribed.

Furthermore, FIG. 8 indicates that the management content indicating "prohibition of authentication of time-limited employees after their termination" is set in the management policy P04. This indicates that, when, for example, a time-limited employee, such as an intern, uses an authentication device, the authentication process (e.g., key) is to be disabled by the authentication device management device 100 after elapse of the subject limit.

Furthermore, the management policy indicated above is an example and the authentication device management device 100 may also accept an input of, for example, various management policies other than the management policies described above from an administrator or the like in the corporation and performs the management process in accordance with the received content. For example, an example of the management policy other than those illustrated in FIG. 8 includes a case in which an administrator arbitrarily designates an authentication approach used by a user, such as "designating only the authentication method performed based on a fingerprint", with respect to an authentication device having a plurality of authentication approaches (authentication performed based on a fingerprint, authentication performed based on an iris, etc.).

Control Unit 130

The control unit 130 is, for example, a controller and is implemented by, for example, a central processing unit (CPU), a micro processing unit (MPU), or the like, executing various kinds of programs (e.g., non-transitory computer readable medium including stored instructions executed by a microprocessor), corresponding to an example of an authentication device management program according to the example implementation, which are stored in a storage device in the authentication device management device 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 5, the control unit 130 includes an acquiring unit 131, a generating unit 132, a registration unit 133, a transmission unit 134, a request accepting unit 135, a responding unit 136, and a management unit 137 and implements or executes the function or the operation of the information processing described below. Furthermore, the internal configuration of the control unit 130 is not limited to the configuration illustrated in FIG. 5 and another configuration may also be used as long as the configuration in which the information processing described below is performed. Furthermore, the connection relation between the processing units included in the control unit 130 is not limited to the connection relation illustrated in FIG. 5 and another connection relation may also be used.

Acquiring Unit 131

The acquiring unit 131 acquires various kinds of information. For example, the acquiring unit 131 acquires information related to the users to be managed via an input performed by an administrator or the like of the authentication device management device 100. Furthermore, the acquiring unit 131 acquires, as the information related to the user, information related to the user terminal 10 (authentication device) used by the user. Furthermore, the acquiring unit 131 acquires the management policy used for the management. The acquiring unit 131 stores the acquired information in the storage unit 120. Furthermore, the acquiring unit 131 acquires, in accordance with a process, various kinds of information from the storage unit 120.

Generating Unit 132

The generating unit 132 generates a pair of a private key that is used to attach a signature with respect to the authentication result obtained by the authentication device that performs personal authentication of a user and a public key that is used to verify the signature attached by using the private key. Furthermore, the generating unit 132 attaches a key identifier for each generated key pair.

The generating unit 132 generates a pair of a private key and a public key based on the information related to the user acquired by the acquiring unit 131. For example, the generating unit 132 provides, in association with the generated key pair, a user ID of a user to whom the keys are assigned. Furthermore, the generating unit 132 may also designate, based on the attribute information on the user, a validity period of authentication of each of the users. Then, the generating unit 132 generates a key pair that can be used only the period designated by the subject designation information.

Furthermore, the generating unit 132 generates a pair of a private key and a public key by using the cryptographic algorithm selected based on the information related to the user. For example, the generating unit 132 may also generate by changing the cryptographic algorithm, such as generating, regarding the key to be assigned to the employee belonging to a specific department, by using an algorithm for an RSA encryption and generating, regarding the key to be assigned to the employee belonging to another department, by using an algorithm for elliptic curve cryptography.

Furthermore, the generating unit 132 may also generate, based on the information related to the user acquired by the acquiring unit 131, a private key in which the authentication approach or method for setting the private key in the authentication device has been designated. Specifically, the generating unit 132 designates, based on the attribute information on the user, the authentication method or the like for a user to validate a key. Then, the generating unit 132 generates a key pair that is validated only by the authentication method designated by the subject designation information.

Registration Unit 133

The registration unit 133 registers, in an associated manner, the key identifier for identifying the key pair generated by the generating unit 132 and the user ID that is the user identification information for identifying the user. Specifically, the registration unit 133 associates the generated key pair, the key identifier of the key pair, and the user ID and registers the associated information in the key information storage unit 122.

Transmission Unit 134

The transmission unit 134 transmits the private key generated by the generating unit 132 to the authentication device that is used by the user. Specifically, the transmission unit 134 specifies, based on the user ID associated with the private key, the user (e.g., authentication device) that becomes the transmission destination. Then, the transmission unit 134 transmits, to the specified transmission destination, the private key generated by the generating unit 132. Furthermore, the transmission unit 134 may also transmit, together with the private key, the control information that is used to perform control such that the transmitted private key is to be set in the authentication device. Furthermore, the transmission unit 134 may also receive, from the authentication device, a notification of completion of the setting indicating that the transmitted private key has been set by the authentication device.

Request Accepting Unit 135

The request accepting unit 135 accepts a request for the key information from the authentication server 50 that has received an authentication request from the authentication device. Specifically, the request accepting unit 135 accepts, from the authentication server 50, a request for transmission of a public key that is used to verify the authentication result information on the authentication device that is the transmission source of the authentication request. At this time, the request accepting unit 135 accepts, together with the request for the key information, the key identifier exhibited at the time of authentication request received by the authentication server 50.

Responding Unit 136

The responding unit 136 transmits, as a response, based on the request for the key information accepted by the request accepting unit 135, an instruction to transmit a public key to the authentication server 50. Specifically, the responding unit 136 specifies, based on the key identifier accepted by the request accepting unit 135, the user and the authentication device that make an authentication request to the authentication server 50. Furthermore, the responding unit 136 specifies, based on the key identifier, the public key associated with both the user and the authentication device that make the authentication request to the authentication server 50. Then, the responding unit 136 transmits the specified public key and the user ID to the authentication server 50.

Management Unit 137

The management unit 137 manages, based on the key identifier and the user ID, the validity of the private key transmitted to the authentication device and the public key transmitted to the authentication server 50.

For example, the management unit 137 collectively or individually manages the validity of each of the plurality of private keys transmitted to the authentication devices and each of the plurality of public keys transmitted to the authentication server 50. Namely, with the management unit 137, it is possible to specify the transmission destination of the assigned key based on the key identifier; therefore, it is possible to collectively or individually manage the validity of the keys.

Specifically, the management unit 137 manages, based on a time period (e.g., predetermined) that is previously set when the private key and the public key are generated, the validity of the private key transmitted to the authentication device and the public key transmitted to the authentication server 50. As described above, the generating unit 132 can set, at the time of generating the keys, the validity period of the keys based on the attribute information or the like on the users. By referring to the validity period, the management unit 137 performs control such that a private key or a public key whose validity period has been expired is to be disabled. For example, at the timing at which the authentication device generates the authentication result information, the timing at which the authentication result information is transmitted from the authentication device to the authentication server 50, the timing at which an authentication token is transmitted from the authentication server 50 to the authentication device, or the like, the management unit 137 refers to the date and time at which the transmitted and received pieces of information were generated. Then, if the date and time at which these pieces of the information were generated is not included in the validity period, the management unit 137 transmits the control information indicating that these pieces of information related to the authentication are set to invalid to the authentication device or the authentication server 50.

Furthermore, based on the time period (e.g., predetermined) or the time zone (e.g., predetermined) designated after the private key and the public key have been generated, the management unit 137 may also manage the validity of the private key transmitted to the authentication device and the public key transmitted to the authentication server 50. Namely, in addition to the previously set validity period, the management unit 137 may also manage the validity of the key by referring to, for example, the period or the time zone that is set in the management policy accepted after the keys have been generated.

Furthermore, based on the key identifier and the user ID, the management unit 137 may also specify the authentication device in which the private key has been set and may also manage a process of updating the program (e.g., non-transitory computer readable medium including stored instructions executed by a microprocessor) used for the authentication process in the subject authentication device. Specifically, the management unit 137 performs control of newly installed authentication software used for the authentication process performed in the authentication device or performs control of an update of the version of the authentication software. For example, the management unit 137 may also perform a process of updating the program (e.g., non-transitory computer readable medium including stored instructions executed by a microprocessor) based on the order of the settings performed in the management policy (for example, an update priority is given to the authentication device used by a department in which security management is strict).

Furthermore, the process performed by the management unit 137 described above is an example and the management unit 137 may also periodically and continuously perform management related to both the authentication device and the authentication server 50 in accordance with various management policies. For example, if an employee retired, the management unit 137 performs management so as to invalidate the private key related to the authentication device that was used by the subject employee. Furthermore, the management unit 137 may also limit or designate the server or the service related to the authentication device that can perform the authentication process (e.g., registration process). Furthermore, for example, when a corporation installs two-stage authentication instead of the related art authentication method, the management unit 137 may also perform management of controlling the authentication device or transmitting a notification to the authentication device so as to newly perform registration into the authentication server 50 by using the new authentication approach. In this way, the management unit 137 performs management in accordance with the management policy that is commonly applied to the plurality of authentication devices, whereby, for example, a system administrator or the like in the corporation can save trouble in setting the validity of a key for each of the authentication devices.

4. Configuration of the User Terminal

Figure 9:
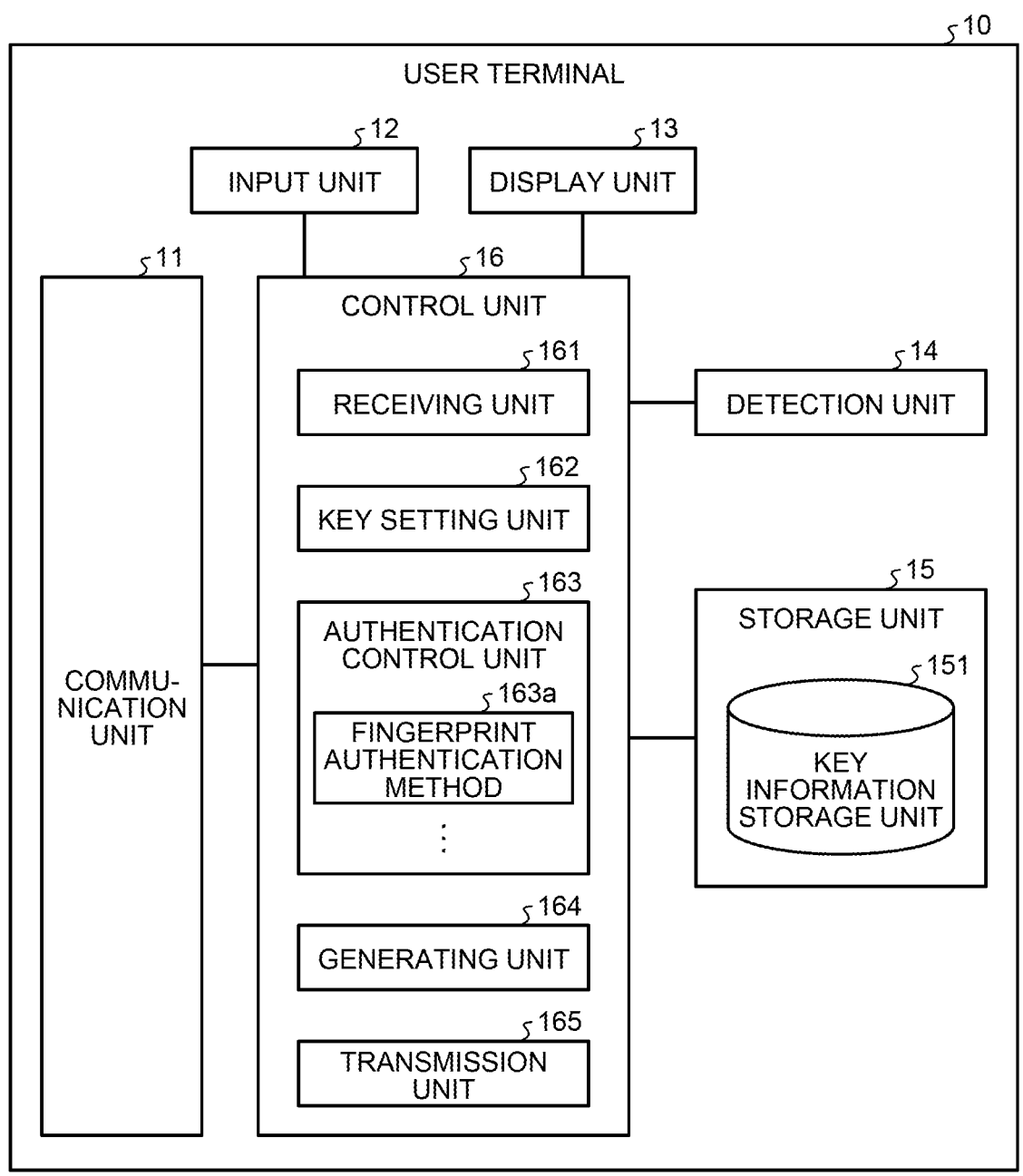
FIG. 9 is a diagram illustrating a configuration example of a user terminal according to the example implementation.

In the following, a configuration of the user terminal 10 according to the example implementation will be described with reference to FIG. 9. FIG. 9 is a diagram illustrating a configuration example of the user terminal 10 according to the example implementation. As illustrated in FIG. 9, the user terminal 10 includes a communication unit 11, an input unit 12, a display unit 13, a detection unit 14, a storage unit 15, and a control unit 16.

Communication Unit 11

The communication unit 11 is implemented by, for example, a NIC, or the like. The communication unit 11 is connected to the network N in a wired or wireless manner and transmits and receives information to and from the authentication server 50 or the authentication device management device 100 via the network N.

Input Unit 12 and Display Unit 13

The input unit 12 is an input device that accepts various operations from a user. For example, the input unit 12 is implemented by an operation key or the like provided in the user terminal 10. The display unit 13 is a display device for displaying various kinds of information. For example, the display unit 13 is implemented by a liquid crystal display or the like. Furthermore, if a touch panel is used for the user terminal 10, a part of the input unit 12 and the display unit 13 are integrated.

Detection Unit 14

The detection unit 14 detects various kinds of information related to the user terminal 10. Specifically, the detection unit 14 detects an operation performed by a user performed on the user terminal 10, location information in which the user terminal 10 is located, information related to a device connected to the user terminal 10, an environment of the user terminal 10, and the like.

For example, based on the information input to the input unit 12, the detection unit 14 detects an operation performed by a user. Namely, the detection unit 14 detects that an operation of touching a screen has been input to the input unit 12, detects that a voice input has been received, or the like. Furthermore, the detection unit 14 may also detect that an application (e.g., predetermined) has been started up by a user. If the application is an application for operating an image capturing function (for example, a camera) included in the user terminal 10, the detection unit 14 detects that the image capturing function is being used by the user. Furthermore, the detection unit 14 may also detect, based on the data detected by an acceleration sensor, a gyro sensor, or the like provided in the user terminal 10, the user terminal 10 itself is being operated.

Furthermore, the detection unit 14 detects the current location of the user terminal 10. Specifically, the detection unit 14 receives radio waves output from a global positioning system (GPS) satellite and acquires, based on the received radio waves, the location information indicating the current location of the user terminal 10 (for example, the latitude and the longitude). Furthermore, the detection unit 14 may also acquire the location information by using various techniques. For example, if the user terminal 10 has a function equal to the function of a contactless IC card used at ticket gates at stations, stores, or the like (or, if the user terminal 10 has a function for reading the history of the contactless IC card), the used location is recorded together with the information indicating that settlement of a fare has been made by the user terminal 10 at the station. The detection unit 14 detects the subject information and acquires the information as the location information. Furthermore, if the user terminal 10 performs communication with a specific access point, the detection unit 14 may also detect the location information that can be acquired from the access point. Furthermore, the location information may also be acquired by an optical sensor, an infrared sensor, a magnetic sensor, or the like included in the user terminal 10.

Furthermore, the detection unit 14 detects an external device connected to the user terminal 10. For example, the detection unit 14 detects the external device based on an exchange of communication packet with the external device each other, based on the signals output from the external device, or the like. Specifically, the detection unit 14 detects radio waves of Wifi (registered trademark), Bluetooth (registered trademark), or the like used by the external device. Furthermore, if communication is established with the external device, the detection unit 14 may also detect the type of connection to the external device. For example, the detection unit 14 detects whether the detection unit 14 is connected to the external device is connected in a wired manner or connected by wireless communication. Furthermore, the detection unit 14 may also detect a communication method used for wireless communication. Furthermore, the detection unit 14 may also detect the external device based on a radio wave sensor that detects radio wave output from the external device or based on the information acquired by an electromagnetic sensor or the like that detects electromagnetic waves.

Furthermore, the detection unit 14 detects an environment of the user terminal 10. The detection unit 14 uses various sensors or functions included in the user terminal 10 and detects information related to the environment. For example, the detection unit 14 uses a microphone that collects sounds around the user terminal 10, an illuminance sensor that detects illuminance around the user terminal 10, an acceleration sensor (or, a gyro sensor, etc.) that detects physical movements of the user terminal 10, a humidity sensor that detects humidity around the user terminal 10, a terrestrial magnetism sensor that detects magnetic fields at the location in which the user terminal 10 is present, or the like. Then, the detection unit 14 various kinds of information by using various sensors. For example, the detection unit 14 detects a noise level around the user terminal 10 or detects whether the surroundings of the user terminal 10 is illuminance appropriate for capturing the iris of the user. Furthermore, the detection unit 14 may also detects environmental information on the surroundings based on the photographs or video images captured by a camera.

Furthermore, the user terminal 10 may also acquire, based on the information detected by the detection unit 14, context information indicating context of the user terminal 10. As described above, the user terminal 10 uses various built-in sensors (e.g., the detection unit 14) and acquires various kinds of physical amount, such as a location, acceleration, a temperature, gravity, rotation (e.g., angular velocity), illuminance, terrestrial magnetism, pressure, proximity, humidity, a rotation vector, as the context information. Furthermore, the user terminal 10 may also use a built-in communication function and acquire connection statuses with various devices (for example, information related to establishment of communication or communication standard that is used) or the like as the context information.

Storage Unit 15

The storage unit 15 stores various kinds of information. The storage unit 15 is implemented by, for example, semiconductor memory device, such as a RAM or a flash memory, or a storage device, such as a hard disk or an optical disk. A key information storage unit 151 is included in the storage unit 15.

Key Information Storage Unit 151

Figures 10, 11:
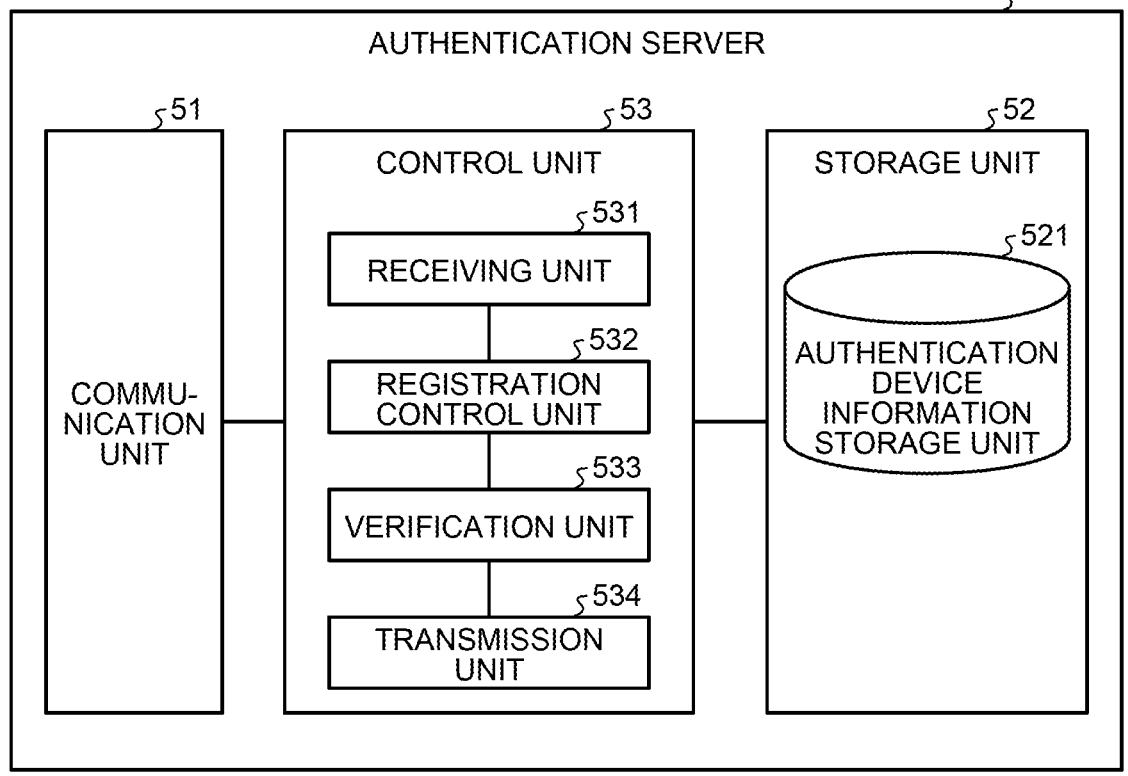
FIG. 10 is a diagram illustrating an example of a key information storage unit according to the example implementation.
FIG. 11 is a diagram illustrating a configuration example of an authentication server according to the example implementation.

The key information storage unit 151 stores therein information related to a private key that is generated by the authentication device management device 100 and that is transmitted form the authentication device management device 100. Here, FIG. 10 illustrates an example of the key information storage unit 151 according to the example implementation. FIG. 10 is a diagram illustrating an example of the key information storage unit 151 according to the example implementation. As illustrated in FIG. 10, the key information storage unit 151 has items, such as "private key ID", "key identifier", "validated authentication method", "validated server", and the like.

The "private key ID" and the "key identifier" correspond to the same items illustrated in FIG. 7. The "validated authentication method" indicates a means for authenticating the identity of a user used to set a private key or used to validate the authentication process to be performed on the authentication server 50. The "validated server" indicates information for specifying the server in which the user terminal 10 has been registered (validated) as an authentication device.

Namely, FIG. 10 indicates that, as an example of the information stored in the key information storage unit 151, the private key ID "KA01" and the private key KA01 that is identified by the key identifier "KI01" are set in the user terminal 10; the authentication approach or method for validating the private key KA01 is a "fingerprint"; and the server that has validated the user terminal 10 as an authentication device is the "authentication server 50".

Control Unit 16

The control unit 16 is a controller and is implemented by, for example, a CPU, an MPU, or the like, executing various programs (e.g., non-transitory computer readable medium including stored instructions executed by a microprocessor), which are stored in a storage device included in the user terminal 10, by using a RAM as a work area. Furthermore, the control unit 16 is a controller and is implemented by, for example, an integrated circuit, such as an ASIC or an FPGA.

As illustrated in FIG. 9, the control unit 16 includes a receiving unit 161, a key setting unit 162, an authentication control unit 163, a generating unit 164, and a transmission unit 165 and implements or executes the function or the operation of information processing described below. Furthermore, the internal configuration of the control unit 16 is not limited to the configuration illustrated in FIG. 9 and another configuration may also be used as long as the configuration in which the information processing described below is performed.

Receiving Unit 161

The receiving unit 161 receives various kinds of information. For example, the receiving unit 161 receives a private key transmitted from the authentication device management device 100. Furthermore, the receiving unit 161 may also receive the control information transmitted from the authentication device management device 100. For example, in the control information, an instruction (script) to control the setting of a private key in the user terminal 10, an instruction to perform management (for example, a validity period of the private key) on the user terminal 10 in which the private key has been set, or the like is included.

Key Setting Unit 162

The key setting unit 162 sets a private key received by the receiving unit 161. Specifically, the key setting unit 162 performs a process of setting the received private key as a key for signing the result of the authentication process.

For example, if information designated by the authentication device management device 100 is attached to the received private key, the key setting unit 162 sets a private key in accordance with the designated information. Specifically, if the authentication method has been designated by the authentication device management device 100, the key setting unit 162 sets the private key by authenticating the user itself by the designated authentication method.

If, for example, authentication of the user has been completed, the key setting unit 162 stores the private key in the key information storage unit 151 that is a storage area (e.g., predetermined). This storage area is a storage area that is available to be accessed only when, for example, personal authentication of a user is completed.

By storing the private key in this storage area, the setting of the private key performed by the key setting unit 162 is completed. When the setting of the private key has been completed, the key setting unit 162 transmits this information to the authentication device management device 100.

Furthermore, if the key setting unit 162 has set the private key, the key setting unit 162 transmits an authentication request to the registration destination (the authentication server 50 in the example implementation) in accordance with the registration destination information or the like designated by the private key. Then, in response to the request from the authentication server 50, the key setting unit 162 transmits a key identifier to the authentication server 50. Thereafter, if the authentication server 50 receives the public key associated with the private key from the authentication device management device 100 and completes the setting as the authentication device, the key setting unit 162 receives this state. If validation as the authentication device with respect to the authentication server 50 has been completed, the key setting unit 162 associates the key information with the validated server and stores the associated information in the key information storage unit 151.

Authentication Control Unit 163

The authentication control unit 163 controls the authentication process of authenticating the identity of a user. For example, the authentication control unit 163 has an authentication method (e.g., function) performed by a method or approach such as fingerprint authentication 163a or the like. The authentication control unit 163 starts up, for example, authentication software associated with the authentication and executes authentication of the user. For example, if an authentication request is generated, the authentication control unit 163 starts up the authentication software instructs the user to input biometric information, such as a fingerprint. Then, the authentication control unit 163 authenticates the identity of the user based on checking the biometric information that has been input by the user against the previously registered correct data.

Generating Unit 164

The generating unit 164 generates authentication result information by signing, if the authentication process with respect to the user is performed by the authentication control unit 163, the obtained authentication result by using the private key.

Transmission Unit 165

The transmission unit 165 transmits various kinds of information. For example, the transmission unit 165 transmits the authentication result information generated by the generating unit 164 to the authentication server 50.

5. Configuration of the Authentication Server

In the following, a configuration of the authentication server 50 according to the example implementation will be described with reference to FIG. 11. FIG. 11 is a diagram illustrating a configuration example of the authentication server 50 according to the example implementation. As illustrated in FIG. 11, the authentication server 50 includes a communication unit 51, a storage unit 52, and a control unit 53. Furthermore, the authentication server 50 may also include an input unit (for example, a keyboard, a mouse, etc.) that accepts various operations from an administrator or the like who uses the authentication server 50 or a display unit (for example, a liquid crystal display, etc.) for displaying various kinds of information.

Communication Unit 51

The communication unit 51 is implemented by, for example, a NIC or the like. The communication unit 51 is connected to the network N in a wired or a wireless manner and transmits and receives information to and from the user terminal 10 or the authentication device management device 100 via the network N.

Storage Unit 52

The storage unit 52 is implemented by, for example, a semiconductor memory device, such as a RAM or a flash memory, or a storage device, such as a hard disk or an optical disk. The storage unit 52 includes the authentication device information storage unit 521.

Authentication Device Information Storage Unit 521

The authentication device information storage unit 521 stores therein information related to an authentication device. Here, FIG. 12 illustrates an example of the authentication device information storage unit 521 according to the example implementation. FIG. 12 is a diagram illustrating an example of the authentication device information storage unit 521 according to the example implementation. In the example illustrated in FIG. 12, the authentication device information storage unit 521 has items, such as "validated authentication device", "user ID", "key identifier", "public key ID", and the like.

The "validated authentication device" indicates the name of the authentication device registered as the authentication target. The "user ID" indicates identification information on a user who uses the validated authentication device. The "key identifier" and the "public key ID" correspond to the same items as those illustrated in FIG. 7.

Namely, FIG. 12 indicates that, as an example of the information stored in the authentication device information storage unit 521, the validated authentication device of the "smartphone 10a" is an authentication device used by the user U01 identified by the user ID "U01" and the key identifier is "KI01". Furthermore, FIG. 12 indicates that the public key that is used to verify (e.g., decode) the signature of the authentication result information transmitted from the smartphone 10a is the public key KB01 that is identified by the public key ID "KB01".

Control Unit 53

The control unit 53 is, for example, a controller and is implemented by, for example, a CPU, an MPU, or the like, executing various programs (e.g., non-transitory computer readable medium including stored instructions executed by a microprocessor), which are stored in a storage device included in the authentication server 50, by using a RAM as a work area. Furthermore, the control unit 53 is a controller and is implemented by, for example, an integrated circuit, such as an ASIC or an FPGA.

As illustrated in FIG. 11, the control unit 53 includes a receiving unit 531, a registration control unit 532, a verification unit 533, and a transmission unit 534 and implements or executes the function or the operation of the information processing described below. Furthermore, the internal configuration of the control unit 53 is not limited to the configuration illustrated in FIG. 11 and another configuration may also be used as long as the configuration in which the information processing described below is performed. Furthermore, the connection relation between the processing units included in the control unit 53 is not limited to the connection relation illustrated in FIG. 11 and another connection relation may also be used.

Receiving Unit 531

The receiving unit 531 receives an authentication request transmitted from the user terminal 10. Furthermore, if the user terminal 10 is not the authentication device registered in the authentication server 50, the receiving unit 531 requests the user terminal 10 to transmit the key identifier of the key held by the user terminal 10. Furthermore, if the user terminal 10 is the authentication device registered in the authentication server 50, the receiving unit 531 transmits the transmitted authentication result information, in addition to the transmitted authentication request to the verification unit 533.

Registration Control Unit 532

The registration control unit 532 controls registration of the authentication device. For example, if the user terminal 10 that has transmitted the authentication request is not the authentication device registered in the authentication server 50, the registration control unit 532 acquires the key identifier of the key held by the user terminal 10. Then, the registration control unit 532 submits the acquired key identifier and requests the authentication device management device 100, which is the generation source of the key, to transmit the public key.

Then, the registration control unit 532 associates the public key transmitted from the authentication device management device 100, the user ID of the user used by the user terminal 10, and the key identifier and stores the associated information in the authentication device information storage unit 521. Consequently, the registration process performed on the authentication device by the registration control unit 532 has been completed.

Verification Unit 533

The verification unit 533 verifies the authentication result information transmitted from the user terminal 10 (authentication device). Specifically, by performing decoding by using the public key associated with the signature attached to the authentication result information, the verification unit 533 verifies whether the subject authentication result information is truly generated by the user terminal 10. The verification unit 533 transmits the verification result to the transmission unit 534.

Transmission Unit 534

The transmission unit 534 transmits the verification result obtained by the verification unit 533 to the user terminal 10. For example, if it is verified that the authentication result information has truly been generated by the user terminal 10, the transmission unit 534 transmits this state to the user terminal 10. In other words, the transmission unit 534 transmits, to the user terminal 10, the information indicating that the authentication of the user performed by the authentication server 50 has been successful. Furthermore, if it is not verified that the authentication result information has truly been generated by the user terminal 10, the transmission unit 534 transmits this state to the user terminal 10. In other words, the transmission unit 534 transmits, to the user terminal 10, information indicating that authentication of the user performed by the authentication server 50 has failed. In this case, the transmission unit 534 may also request the user terminal 10 to retransmit the authentication result information.

6. Flow of the Process

Figure 13:
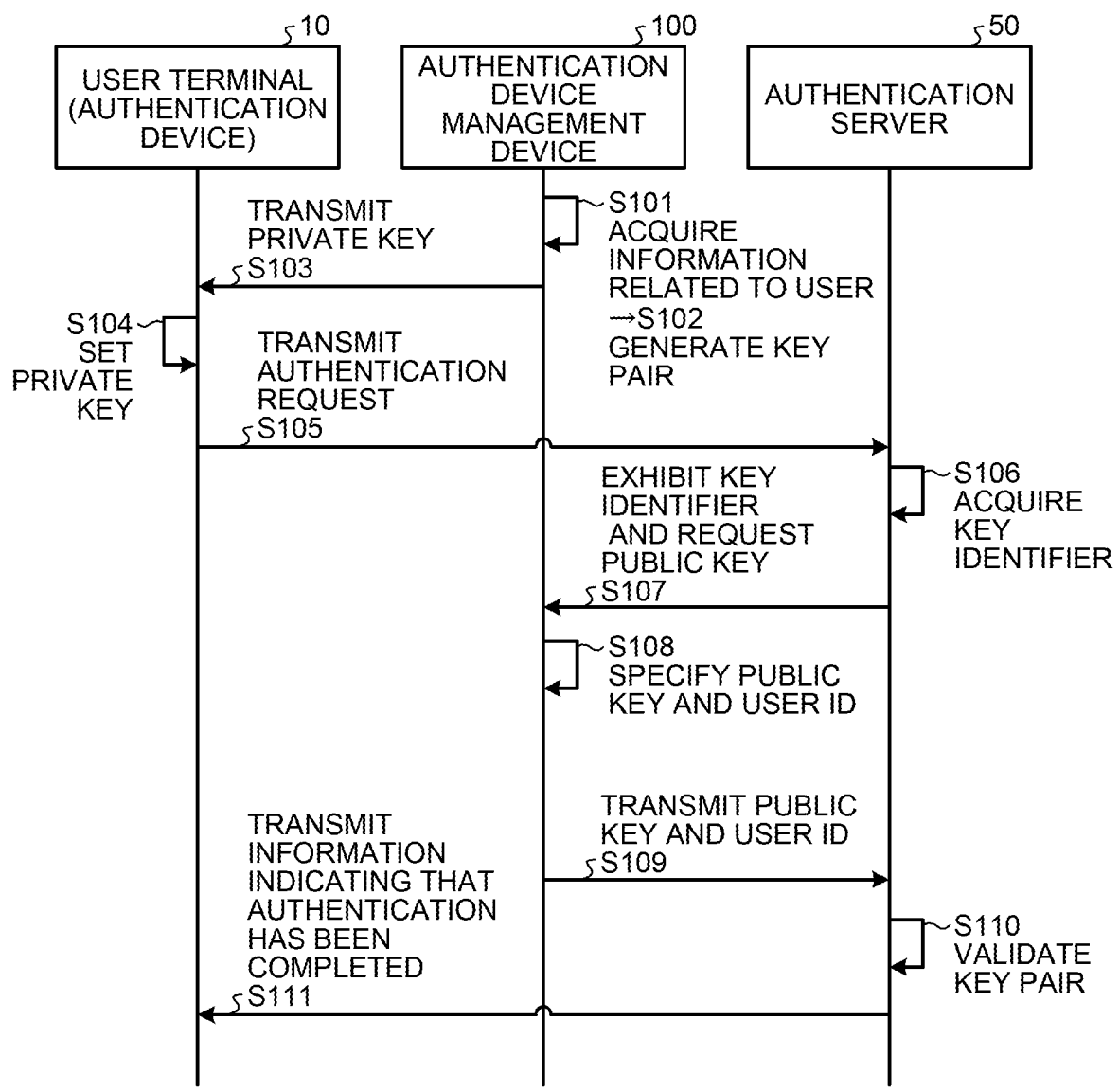
FIG. 13 is a sequence diagram illustrating the processing flow according to the example implementation.

In the following, the flow of the process performed by the authentication device management system 1 according to the example implementation will be described with reference to FIG. 13. FIG. 13 is a sequence diagram illustrating the processing flow according to the example implementation.

As illustrated in FIG. 13, the authentication device management device 100 acquires information related to a user to be managed (S101). Then, the authentication device management device 100 generates a key pair assigned to the user (S102). Subsequently, the authentication device management device 100 transmits the private key between the generated key pair to the user terminal 10 (authentication device) (S103).

The user terminal 10 that has received the private key performs setting so as to use the private key (S104). After having set the private key, the user terminal 10 transmits an authentication request to the authentication server 50 that verifies the authentication result information (S105).

The authentication server 50 acquires the key identifier included in the authentication request (S106). Furthermore, if a key identifier is not included in the first authentication request, the authentication server 50 may also transmit, to the user terminal 10, a request for a key identifier to be transmitted. The authentication server 50 exhibits the key identifier and requests the authentication device management device 100 to transmit the public key associated with the key identifier (S107).

The authentication device management device 100 specifies, based on the received key identifier, the public key to be transmitted and the user ID that is associated with the key identifier (S108). Then, the authentication device management device 100 transmits the public key and the user ID to the authentication server 50 (S109).

The authentication server 50 associates the received public key, the user ID, and the user terminal 10 and registers the associated information. With this process, the authentication server 50 validates the key pair such that the pair of the private key transmitted to the user terminal 10 and the public key received by the own device can be used (S110). Then, the authentication server 50 transmits information indicating that authentication of the user terminal 10 has been completed (S111).

7. Modification

The process performed by the authentication device management system 1 described above may also be performed with various kinds of example implementations other than the example implementation described above. Therefore, another example implementation of the authentication device management system 1 will be described below.

7-1. Function of the Authentication Device Management Device

In the example described above, an example has been described in which the user terminal 10 sets the private key received from the authentication device management device 100 and requests the authentication server 50 that is the transmission destination of the authentication result information to validate the user terminal 10 as an authentication device. Here, the function of the authentication server 50 may also be held by the authentication device management device 100.

Figure 14:
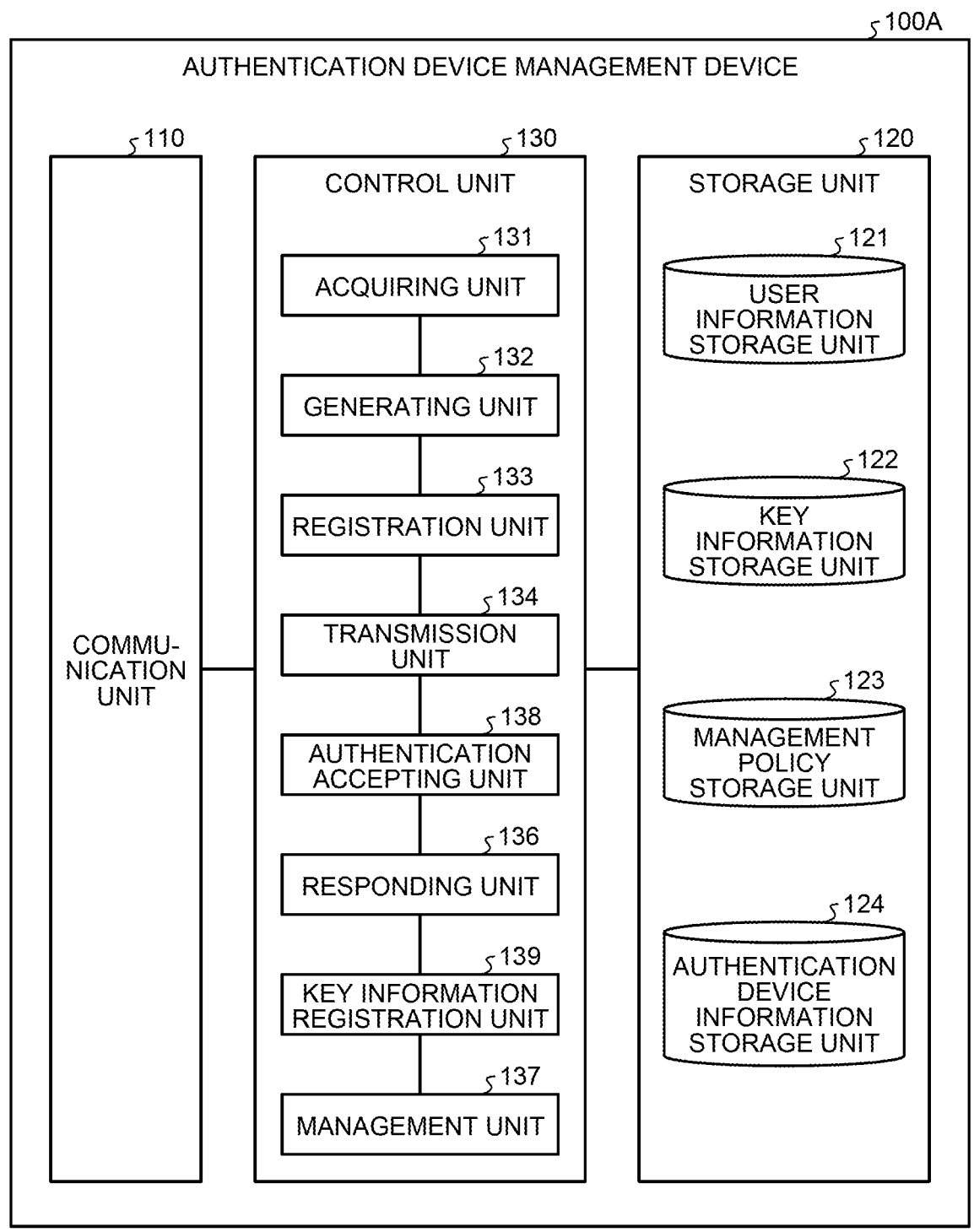
FIG. 14 is a diagram illustrating a configuration example of an authentication device management device according to a modification.

This point will be described with reference to FIG. 14. FIG. 14 is a diagram illustrating a configuration example of an authentication device management device 100A according to a modification. As illustrated in FIG. 14, the authentication device management device 100A according to the modification further includes, when compared with the example illustrated in FIG. 5, an authentication accepting unit 138, a key information registration unit 139, and an authentication device information storage unit 124.

The authentication accepting unit 138 performs the processes corresponding to the receiving unit 531, the verification unit 533, and the transmission unit 534 related to the authentication server 50 illustrated in FIG. 11. Furthermore, the key information registration unit 139 performs the process corresponding to the registration control unit 532 related to the authentication server 50 illustrated in FIG. 11. Furthermore, the authentication device information storage unit 124 stores therein the same information as that stored in the authentication device information storage unit 521 related to the authentication server 50 illustrated in FIG. 11.

Furthermore, when the responding unit 136 accepts the request related to authentication from the authentication device in which the private key has been set, the responding unit 136 responds to the request such that the public key associated with the subject authentication device is validated based on the key identifier and the user ID. Here, validating the public key mentioned here indicates that the authentication result information signed by the private key in the authentication device enters the state in which verification is available by using the subject public key. In other words, validating the public key refers to the authentication device management device 100A having registered the authentication device, which has made the authentication request, as a validated authentication device.

In this way, the authentication device management device 100A according to the modification performs an authentication device registration process performed by the authentication server 50, a verification process of the authentication result information, a process of transmitting and receiving various kinds of information to and from the user terminal 10. Consequently, the authentication device management device 100A according to the modification can perform a registration process (validation process) or the like of the authentication device according to the example implementation without the authentication server 50.

7-2. Variation in Processes

In each of the processes according to the example implementation described above, various kinds of variations may also be present in each of the processes performed by the user terminal 10, the authentication server 50, or the authentication device management device 100.

For example, in the example implementation described above, the process in which the authentication device management device 100 generates a key pair has been described. However, the authentication device management device 100 does not always need to perform the process of generating a key pair of the own device as long as validity of the key pair or rights management of the user terminal 10 can be performed based on a key identifier. This point will be described with reference to FIG. 15 and FIG. 16.

Figure 15:
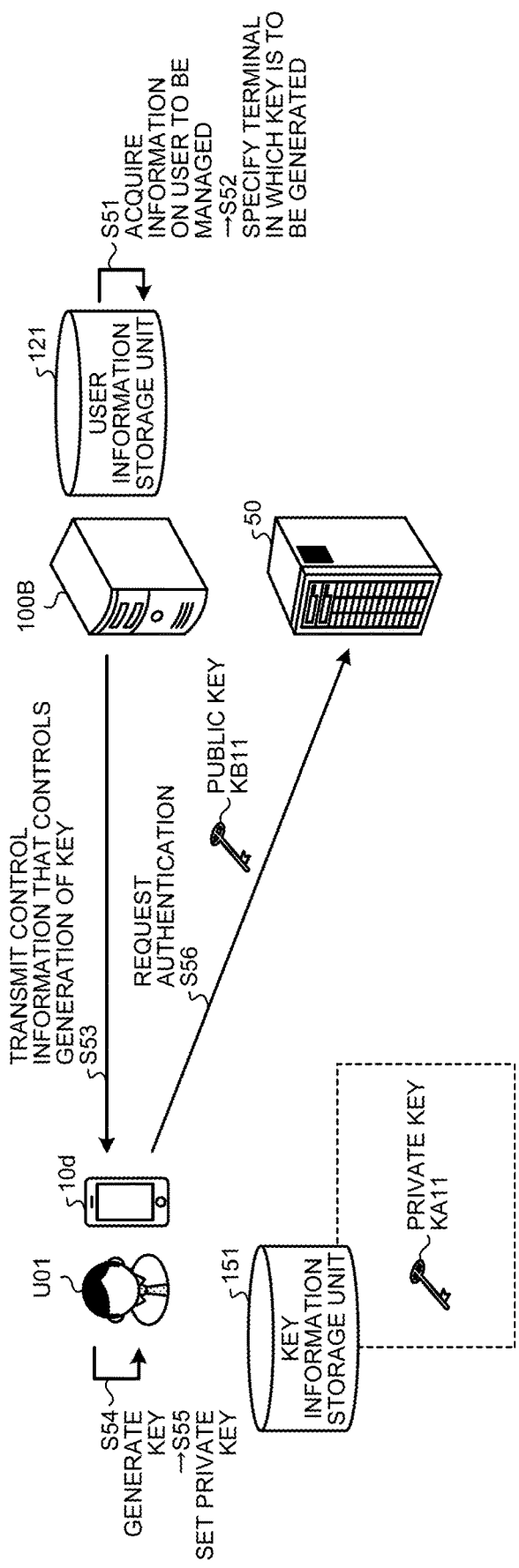
FIG. 15 is a diagram illustrating an example of the authentication device management process according to the modification.

FIG. 15 is a diagram illustrating an example of the authentication device management process according to the modification. It is understood that an authentication device management device 100B illustrated in FIG. 15 does not perform, when compared with the authentication device management device 100 according to the example implementation, a process of generating a key pair of the own device.

In the example illustrated in FIG. 15, the authentication device management device 100B acquires the information on the user to be managed (S51) and specifies, based on the subject information, terminal in which a key pair is to be generated (S52). The terminal in which a key pair is to be generated mentioned here is, for example, the user terminal 10 that has a function that serves as an authentication device and the user terminal 10 that has a function for generating a key pair. In the example illustrated in FIG. 15, it is understood that the authentication device management device 100B specifies a user terminal 10d according to the modification as a terminal in which a key is to be generated.

In this case, the authentication device management device 100B transmits control information for controlling generation of a key to the user terminal 10d (S53). Such control information is, for example, in accordance with the information designated by the authentication device management device 100B, for example, an instruction (e.g., script, etc.) that allows the user terminal 10d to generate a key in which the validity period has been set, a key in which an authentication approach for validating the subject key has been set, or the like. Furthermore, the authentication device management device 100B may also include a key identifier in the subject control information. By issuing the key identifier by the authentication device management device 100B itself, the authentication device management device 100B can perform the same management process as that described in the example implementation. Furthermore, the authentication device management device 100B may also transmit the management policy illustrated in FIG. 7 to the user terminal 10d, and control the process of generating the key performed by the user terminal 10d. Consequently, the authentication device management device 100B can generate a key in accordance with the method conforming to the management policy that has been set by an administrator or the like in an enterprise such as a corporation.

The user terminal 10d generates a key pair in accordance with the control information transmitted from the authentication device management device 100B (S54). For example, the user terminal 10d generates a pair of the private key KA11 and the public key KB11. At this time, the user terminal 10d associates the generated key pair with the key identifier that has been issued by the authentication device management device 100B. Then, the user terminal 10d performs setting such that the private key KA11 between the generated key pair can be used (S55). This process is the same as that performed at S05 illustrated in FIG. 1. The user terminal 10d stores the private key KA11 in the key information storage unit 151.

Then, the user terminal 10d transmits an authentication request to the authentication server 50 (S56). This process is the same as that performed at S12 illustrated in FIG. 2. In such a request, the authentication server 50 requests the user terminal 10d to transmit the public key KB11. Then, the user terminal 10d responds to the request and transmits the public key KB11 to the authentication server 50. The authentication process and the processes subsequently performed are the same as those performed in the example implementation. Furthermore, when the user terminal 10d generates a key pair, the user terminal 10d may also transmit the public key KB11 to the authentication device management device 100B. In this case, the authentication server 50 transmits, similarly to the example implementation, the transmission request for the public key KB11 to the authentication device management device 100B.

In this way, generating a key pair itself may also be performed by the user terminal 10 or the like, instead of the authentication device management device 100B. In this configuration, because the authentication device management device 100B can also specify, by using the key identifier to be transmitted to the user terminal 10d, the key assigned to each of the authentication devices, it is also possible to perform the management process described in the example implementation.

Furthermore, the authentication device management device 100B does not need to always issue a key identifier by the own device. For example, the authentication device management device 100B may also acquire the key identifier issued by the user terminal 10d when a key pair is generated by the user terminal 10d and may also perform the management process based on the acquired key identifier.

Figure 16:
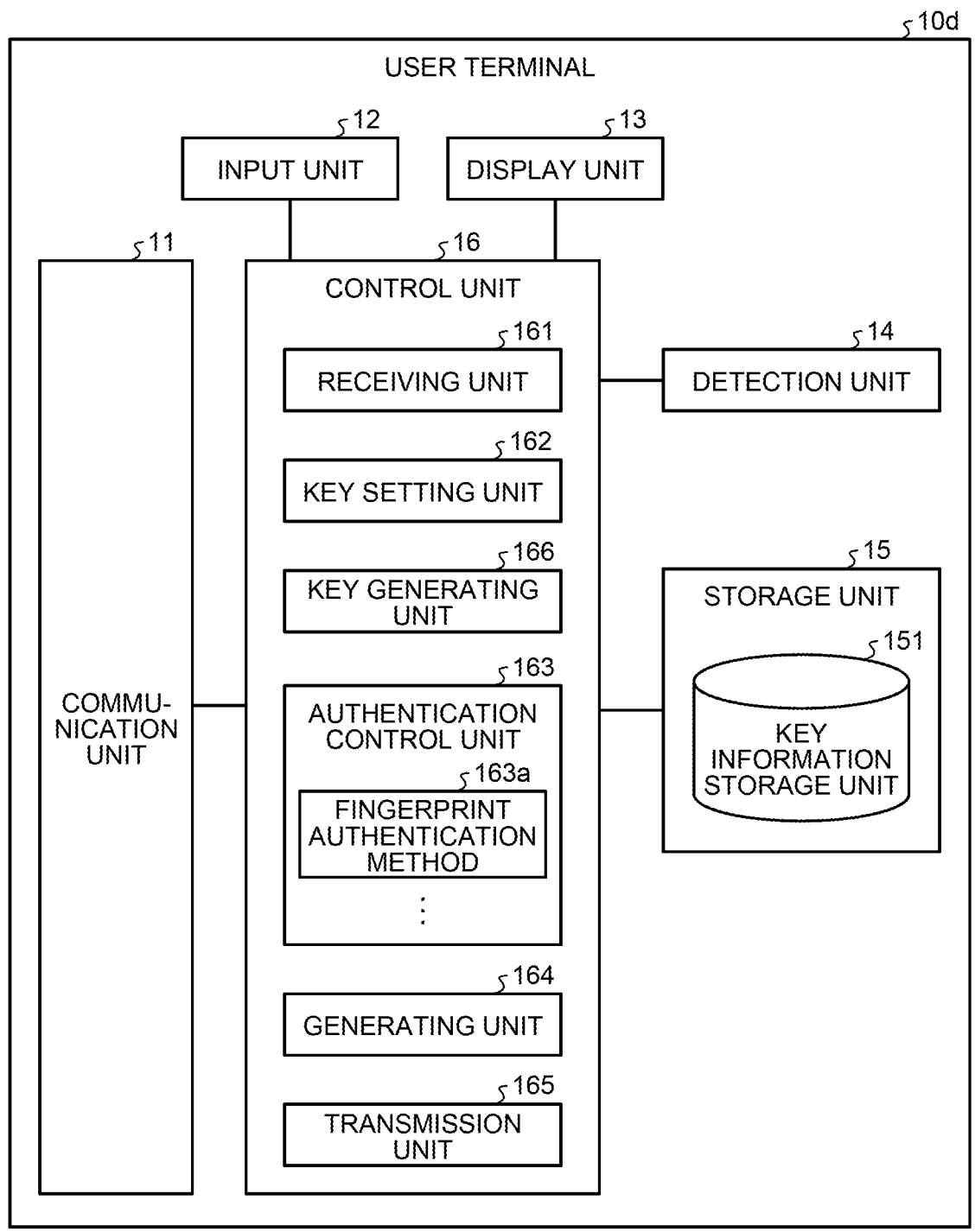
FIG. 16 is a diagram illustrating a configuration example of a user terminal according to the modification.

In the following, a configuration of the user terminal 10d according to the modification described above will be described with reference to FIG. 16. FIG. 16 is a diagram illustrating a configuration example of the user terminal 10d according to the modification. As illustrated in FIG. 16, the user terminal 10d according to the modification further includes a key generating unit 166, when compared with the example illustrated in FIG. 9.

The key generating unit 166 performs the same process as that performed by the generating unit 132 and the registration unit 133 related to FIG. 5. Specifically, in accordance with the control information transmitted from the transmission unit 134 related to the authentication device management device 100B, the key generating unit 166 generates a pair of the private key that is used to attach a signature to the authentication result of personal authentication of a user and the public key that is used to verify the signature attached by using the private key. Furthermore, the key generating unit 166 associates the key identifier for identifying the generated key pair and the user ID for identifying a user and stores the associated information in the key information storage unit 151. For example, the key generating unit 166 may also generate, based on the designation information that has previously been set by the authentication device management device 100B, a key pair in which the designated validity period or the like has been set.

Furthermore, the user terminal 10d according to the modification may also include a management unit corresponding to the management unit 137 related to the authentication device management device 100. Namely, the user terminal 10d may also control, by the own device, management of the private key held by the own device of the public key transmitted to the authentication server 50.

7-3. Configuration of the User Terminal

In the example implementation and the modification described above, the configuration example of the user terminal 10 has been described with reference to FIG. 9 and FIG. 16; however, the user terminal 10 does not always have the entire configuration illustrated in FIG. 9 or FIG. 16. As described above, in addition to the smart device, such as the smartphone 10a or the tablet 10b, examples of the user terminal 10 include various devices, such as the watch type terminal 10c or an eyeglass type terminal having a communication function or a fingerprint collation dedicated apparatus that collates a fingerprint of a user. In this case, the user terminal 10 does not always receive an input from a user but may have a function for acquiring information via communication and transmitting the acquired information to the communication network. Namely, the user terminal 10 does not always have the configuration illustrated in FIG. 9 or FIG. 16 as long as the device has a communication function (e.g., predetermined) such as implementing a so called Internet of Things (IoT).

7-4. Issuing a Key (Generation)

In the example implementation and the modification described above, an example in which a single key pair is assigned to a single user; however, the authentication device management device 100 may also assign a plurality of keys to a single user. In this case, the authentication device management device 100 manages a user based on the user ID and manages the plurality of key pairs based on the key identifier that is attached for each key pair. For example, the authentication device management device 100 may also assign a different key for each authentication approach, or may also assign a different key for each target (server or the like corresponding to the authentication server 50) at the authentication destination.

7-5. Application Case Example

In the example implementation and the modification described above, for example, a case example in which the authentication device management device 100 generates a key to be assigned to the employee in the corporation has been described; however, the authentication device management process according to the example implementation and the modification described above is not limited to this case example.

For example, the authentication device management device 100 may also be used for management of the user terminal 10 purchased by a parent to a child. As described above, because the authentication device management device 100 can designate a time zone in which a key is valid (in other words, the time zone in which a service can be used) or the like, for example, it is possible to appropriately perform parental control.

7-6. Management Policy

The authentication device management device 100 may also perform management based on meta-policy that is various combinations of the management policies described above. For example, with the authentication device management device 100, by performing management by using the meta-policy, it is possible to automatically and collectively perform life cycle management with respect to the plurality of authentication devices.

Specifically, the authentication device management device 100 receives a meta-policy indicating that "when "a retirement procedure of a certain employee is started", "the authentication device (key) associated with the subject employee ID is automatically allowed to be expired"". Consequently, when the authentication device management device 100 accepts, as a trigger, an input of information indicating that the retirement procedure of the employee has been started, the authentication device management device 100 can automatically disable the authentication device that was used by the subject employee. Alternatively, the authentication device management device 100 receives a meta-policy indicating that, for example, "temporarily stop the authentication device (key) associated with an employee belonging to a specific laboratory at ZZ (time) on YY (date)/XX (month)". Consequently, the authentication device management device 100 can control the entire of the authentication device in accordance with the management technique designed by system administrators or the like in a corporation.

7-7. Control Information

Control or management of the user terminal 10 performed by the authentication device management device 100 may also be performed by various arbitrary method. For example, a user installs an application (e.g., authentication software) for controlling the authentication process in the user terminal 10. Then, by transmitting control information to the subject application, the authentication device management device 100 may also control the authentication process of the user terminal 10 or manages the validity of the key. The control information corresponds to an authentication device management program (e.g., non-transitory computer readable medium including stored instructions executed by a microprocessor) according to the example implementation and is implemented by, for example, Cascading Style Sheets (CSS), JavaScript (registered trademark), HTML, or an arbitrary language that can describe the authentication device management process described above or implemented by an arbitrary program (e.g., non-transitory computer readable medium including stored instructions executed by a microprocessor).

8. Hardware Configuration

Figure 17:
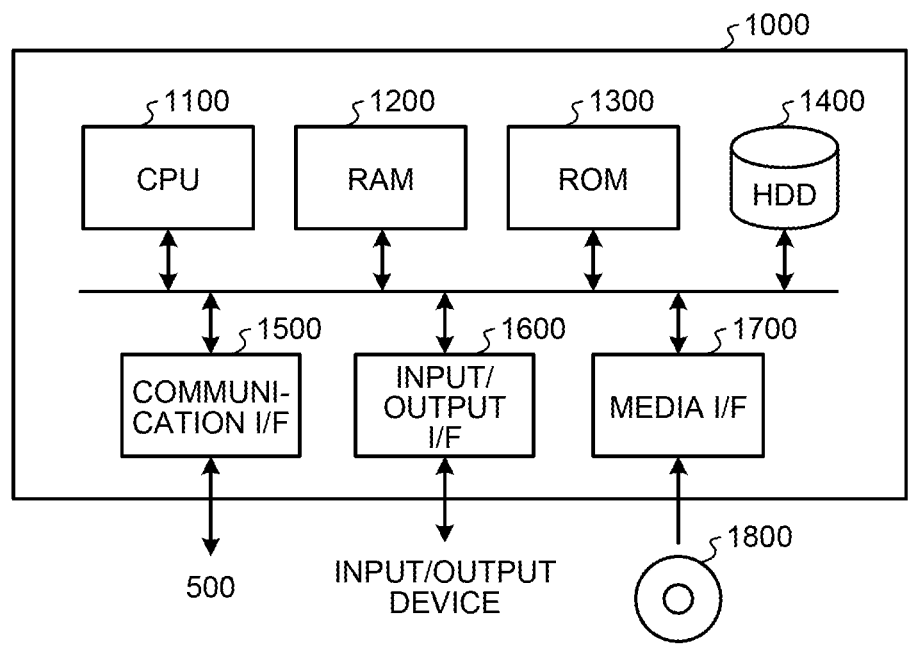
FIG. 17 is a diagram illustrating an example of a hardware configuration of a computer that implements the function performed by the authentication device management device.

The authentication device management device 100, the user terminal 10, and the authentication server 50 according to the example implementation described above are implemented by a computer 1000 having the configuration illustrated in, for example, FIG. 17. In the following, explanation will be given by using the authentication device management device 100 as an example. FIG. 17 is a diagram illustrating an example of a hardware configuration of the computer 1000 that implements the function performed by the authentication device management device 100. The computer 1000 includes a CPU 1100, a RAM 1200, a read only memory (ROM) 1300, a hard disk drive (HDD) 1400, a communication interface (I/F) 1500, an input/output interface (I/F) 1600, and a media interface (I/F) 1700.

The CPU 1100 operates on the basis of the programs stored in the ROM 1300 or the HDD 1400 and performs control of each of the devices. The ROM 1300 stores therein a boot program (e.g., non-transitory computer readable medium including stored instructions executed by a microprocessor) executed by the CPU 1100 at the time of a startup of the computer 1000, a program (e.g., non-transitory computer readable medium including stored instructions executed by a microprocessor) that depends on the hardware of the computer 1000, and the like.

The HDD 1400 stores therein the program executed by the CPU 1100, data used by the subject program, and the like. The communication interface 1500 receives data from another device via a communication network 500 (corresponds to the network N illustrated in FIG. 4), transmits the received data to the CPU 1100, and transmits the data generated by the CPU 1100 to another device via the communication network 500.

The CPU 1100 controls, via the input/output interface 1600, an output device, such as a display or a printer, and an input device, such as a keyboard or a mouse. The CPU 1100 acquires data from the input device via the input/output interface 1600. Furthermore, the CPU 1100 outputs the generated data to the output device via the input/output interface 1600.

The media interface 1700 reads the program (e.g., non-transitory computer readable medium including stored instructions executed by a microprocessor) or data stored in a recording medium 1800 and provides the read program (e.g., non-transitory computer readable medium including stored instructions executed by a microprocessor) or data to the CPU 1100 via the RAM 1200. The CPU 1100 loads the program from the recording medium 1800 into the RAM 1200 via the media interface 1700 and executes the loaded program. The recording medium 1800 is, for example, an optical recording medium, such as a digital versatile disc (DVD) or a phase change rewritable disk (PD); a magneto optical recording medium, such as a magneto-optical disk (MO); a tape medium; a magnetic recording medium; a semiconductor memory, or the like.

For example, when the computer 1000 functions as the authentication device management device 100 according to the example implementation, the CPU 1100 in the computer 1000 implements the function of the control unit 130 by executing the program loaded into the RAM 1200. Furthermore, the HDD 1400 stores therein data stored in the storage unit 120. The CPU 1100 in the computer 1000 reads the programs from the recording medium 1800 and executes the programs; however, as another example, the CPU 1100 may also acquire the programs from other devices via the communication network 500.

9. Others

Of the processes described in the example implementation, the all or a part of the processes that are mentioned as being automatically performed can also be manually performed, or the whole or a part of the processes that are mentioned as being manually performed can also be automatically performed using related art methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the generating unit 132 and the registration unit 133 illustrated in FIG. 5 may also be integrated. Furthermore, for example, the information stored in the storage unit 120 may also be stored in an external storage device via the network N.

Furthermore, for example, in the example implementation described above, an example in which the authentication device management device 100 performs the generating process of generating a key pair and the transmission process of transmitting the generated private key has been described. However, the authentication device management device 100 described above may also be separated into a generating device that performs the generating process and a transmission device that performs the transmission process. Namely, the authentication device management device 100 may also be separated into a front end server that transmits and receives information to and from the user terminal 10 or the like and a back end server that performs a process based on the received information. In this case, the process performed by the authentication device management device 100 according to the example implementation is implemented by authentication device management system 1 that includes a device that implements the function of the front end server and a device that implements the function of the back end server.

Furthermore, the above-described example implementations and modifications may be combined appropriately as long as the processes do not conflict with each other.

10. Effects

As described above, the authentication device management device 100 according to the example implementation includes the generating unit 132, the registration unit 133, the transmission unit 134, and the responding unit 136. The generating unit 132 generates a pair of a first key (a private key in the example implementation) that is used to attach a signature with respect to the authentication result obtained by the authentication device that performs personal authentication of a user and a second key (e.g., a public key in the example implementation) that is used to verify the signature attach by using the first key. The registration unit 133 associates the key identifier that identifies the key pair generated by the generating unit 132 with user identification information that is used to identify the user and registers the associated information. The transmission unit 134 transmits the first key generated by the generating unit 132 to the authentication device used by the user. When the responding unit 136 accepts, from the authentication server 50 that verifies the signature, a transmission request for the second key related to the authentication device in which the first key transmitted by the transmission unit 134 has been set, the responding unit 136 respond to the transmission request by instructing the authentication server 50 to transmit the second key associated with the subject authentication device based on the key identifier and the user identification information.

In this way, instead of the authentication device, the authentication device management device 100 according to the example implementation generates the key pair in the authentication method (for example, public key encryption method) for performing authentication by using two keys. Then, the authentication device management device 100 transmits the generated first key to the authentication device and transmits, if a request is received from the authentication server 50, the second key that is paired with the first key to the authentication server. Namely, by acting as a role of intermediating between the authentication device and the authentication server 50, the authentication device management device 100 can collectively control and manage the authentication devices that are, in general, individually managed by the authentication server 50. In this way, with the authentication device management device 100, it is possible to efficiently manage a plurality of terminals.

Furthermore, the authentication device management device 100 according to the example implementation further includes the management unit 137 that manages, based on the key identifier and the user identification information, the validity of the first key transmitted to the authentication device and the second key transmitted to the authentication server 50.

In this way, the authentication device management device 100 according to the example implementation can manage the validity of the generated key by generating the key by the own device. Consequently, the authentication device management device 100 can efficiently manage a plurality of terminals.

Furthermore, the management unit 137 collectively or individually manages each of the pieces of the validity of a plurality of the first keys transmitted to the authentication devices and a plurality of the second keys transmitted to the authentication server 50.

In this way, the authentication device management device 100 according to the example implementation can collectively or individually manage each of the pieces of the validity by managing the keys based on the user IDs and the key identifiers. Consequently, the authentication device management device 100 can perform flexible management in accordance with the individual states.

Furthermore, the management unit 137 manages, based on a time period (e.g., predetermined) that is previously set when the first key and the second key are generated, the validity of the first key transmitted to the authentication device and the second key transmitted to the authentication server 50.

In this way, the authentication device management device 100 according to the example implementation performs management in accordance with the period of time that has been set in the key. Consequently, the authentication device management device 100 can perform appropriate management in accordance with various states, such as assigning an authentication device to, for example, a time-limited employee or assigning an authentication device in which a limited authentication period has been set.

Furthermore, based on a time period (e.g., predetermined) or a time zone (e.g., predetermined) designated after the first key and the second key have been generated, the management unit 137 manages the validity of the first key transmitted to the authentication device and the second key transmitted to the authentication server 50.

In this way, the authentication device management device 100 according to the example implementation may also manage the validity of the already assigned key by designation performed by an administrator or the like. For example, the authentication device management device 100 manages the validity of the key in accordance with the management policy that can arbitrarily be set for each corporation. Consequently, the authentication device management device 100 can manage the life cycle of the key, such as generating or terminating the key, as the administrator desires.

Furthermore, based on the key identifier and the user identification information, the management unit 137 specifies the authentication device in which the first key has been set and manages a process of updating the program (e.g., non-transitory computer readable medium including stored instructions executed by a microprocessor) that is used for the authentication process performed in the subject authentication device.

In this way, the authentication device management device 100 according to the example implementation may also manage an update of the authentication software or the like. If the authentication server 50 and the authentication device have a one-to-one authentication relationship, for example, if the authentication software used in a corporation has been updated, all of the employees individually need to perform a process of updating the software and, thus, there may be a case in which software is not unified. In contrast, with the authentication device management device 100 according to the example implementation, by controlling the authentication devices based on the keys generated by the own corresponding devices, it is possible to uniformly update the software. In this way, with the authentication device management device 100, it is possible to reduce the management load with respect to the plurality of terminals.

Furthermore, the authentication device management device 100 according to the example implementation further includes the acquiring unit 131 that acquires the information related to the user. The generating unit 132 generates a pair of the first key and the second key based on the information related to the user acquired by the acquiring unit 131.

In this way, the authentication device management device 100 according to the example implementation can generate, by generating the key based on the user information, the key that can be managed in accordance with the attribute information or the like on the subject user.

Furthermore, the generating unit 132 generates the pair of the first key and the second key by using a cryptographic algorithm selected based on the information related to the user.

In this way, the authentication device management device 100 according to the example implementation can generate the key by using the cryptographic algorithm that is different for each user. Consequently, the authentication device management device 100 can flexibly generate the key by, for example, strengthening the cryptographic algorithm in accordance with a belonging department or using a simple cryptographic algorithm.

Furthermore, the generating unit 132 generates, based on the information related to the user, the first key in which an authentication method for setting the first key has been set in the authentication device.

In this way, the authentication device management device 100 according to the example implementation can generate the key that designates the authentication method or approach. Consequently, by designating, for example, a high-security authentication approach or method (e.g., authentication that uses biometric information or the like on the user), the authentication device management device 100 can guarantee the security of authentication in all of the plurality of terminals.

Furthermore, the authentication device management device 100 may also have a configuration that is different from that described above. For example, the authentication device management device 100A according to the modification includes the generating unit 132, the registration unit 133, the transmission unit 134, and the responding unit 136. The generating unit 132 generates a pair of a first key that is used to attach a signature with respect to the authentication result obtained by the authentication device that performs personal authentication of a user and a second key that is used to verify the signature attached by using the subject first key. The registration unit 133 associates the key identifier that identifies the key pair generated by the generating unit 132 and the user identification information that identifies the user and registers the associated information. The transmission unit 134 transmits the first key generated by the generating unit 132 to the authentication device used by the user. When the responding unit 136 accepts a request related to authentication from the authentication device in which the first key transmitted by the transmission unit 134 has been set, the responding unit 136 responds to the request by instructing that the second key associated with the subject authentication device is to be validated based on the key identifier and the user identification information.

In this way, the authentication device management device 100A according to the modification may also act, by itself, as a role of the authentication server 50. With this configuration, because the authentication device management device 100A can also perform, by itself, a process of validating the key while generating the key, and can also perform the authentication device management process by using simpler system.

Furthermore, the authentication device management device 100 may also have a configuration that is different from that described above. For example, the authentication device management device 100B according to the modification includes the transmission unit 134. The transmission unit 134 transmits control information to the authentication device that performs personal authentication of the user. Furthermore, the control information causes the authentication device to execute a generating process, a registration process, and a transmission process. The generating process generates a pair of the first key that is used to attach a signature with respect to the authentication result of personal authentication that has been performed on the user and the second key that is used to verify the signature attached to the first key. The registration process registers, in an associated manner, the key identifier that identifies the key pair generated in the generating process and the user identification information that identifies the user. The transmission process transmits the second key generated in the generating process to the authentication server 50 that verifies the signature and transmits both the key identifier and the user identification information to the authentication device management device 100B. Furthermore, the generating process and the registration process correspond to the processes performed by the key generating unit 166 illustrated in FIG. 16. Furthermore, the transmission process corresponds to the process performed by the transmission unit 165 illustrated in FIG. 16.

In this way, the authentication device management device 100B according to the modification may also allow the authentication device itself to generate a key by controlling the authentication device. Namely, the authentication device management device 100B can perform the authentication device management process according to the example implementation by instructing, without generating a key in the own device, the authentication device to generate a key. Consequently, the authentication device management device 100B can implement, while reducing the processing load applied to the own device, efficient management of a plurality of terminals.

In the above, example implementations of the present application have been described in detail based on the drawings; however the example implementations are described only by way of an example. In addition to the example implementations described herein, the present application can be implemented in a mode in which various modifications and changes are made in accordance with the knowledge of those skilled in the art.

Furthermore, the "components (sections, modules, units)" described above can be read as "means", "circuits", or the like. For example, a receiving unit can be read as a receiving means or a receiving circuit.

According to an aspect of an example implementation, an advantage is provided in that it is possible to efficiently manage a plurality of terminals.

Although specific example implementations have been described for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authentication device management device comprising: a controller including a processor, the controller configured to perform,
    receiving an authentication result from an authentication device, the authentication device locally performs personal authentication of a user to obtain the authentication result;
    verifying whether the user is the person in question or not using a function for determining the authenticity of the authentication result;
    in response to verifying the user is the person in question, generating a key pair, the generated key pair comprising a first key used to attach a signature and a second key used to verify the signature attached by the first key;
    registering, in an associated manner, a key identifier that identifies the generated key pair and user identification information that identifies the user;
    transmitting the generated first key to the authentication device used by the user; and
    receiving, from an authentication server that is configured to verify the signature, a transmission request for the second key that is related to the authentication device to which the first key was transmitted and in which the first key has been set, the transmission request comprising the key identifier;
    responding to the transmission request by transmitting, to the authentication server, the second key and the user identification information associated with the key identifier included in the transmission request;
    managing, based on the key identifier and the user identification information, the validity of the first key transmitted to the authentication device and the second key transmitted to the authentication server.

2. The authentication device management device according to claim 1, wherein the controller managing comprises the controller collectively or individually managing each of the pieces of the validity of a plurality of the first keys transmitted to the authentication devices and a plurality of the second keys transmitted to the authentication server.

3. The authentication device management device according to claim 1, wherein the managing is based on a time period previously set when the first key and the second key are generated, the validity of the first key transmitted to the authentication device and the second key transmitted to the authentication server.

4. The authentication device management device according to claim 1, wherein the managing is based on a time period or a time zone designated after the first key and the second key have been generated, the validity of the first key transmitted to the authentication device and the second key tra nsmitted to the authentication server.

5. The authentication device management device according to claim 1, wherein, based on the key identifier and the user identification information, the controller performs the managing to specify the authentication device in which the first key has been set and the controller further performs the managing by updating a non-transitory computer reada ble medium including stored instructions executed by a microprocessor used for an authentication process performed in the authentication device.

6. The authentication device management device according to claim 1, the controller further performing acquiring of information related to the user, wherein
the generating performed by the controller is based on the information related to the user acquired by the acquiring, the pair of the first key and the second key.

7. The authentication device management device according to claim 6, wherein the generating performed by the controller comprises generating the pair of the first key and the second key by using a cryptographic algorithm selected based on the information related to the user.

8. The authentication device management device according to claim 6, wherein the generating performed by the controller comprises generating, based on the information related to the user, the first key in which an authentication approach for setting the first key in the authentication device has been designated.

9. An authentication device management device comprising: a controller including a processor, the controller configured to perform,
receiving an authentication result from an authentication device, the authentication device locally performs personal authentication of a user to obtain the authentication result;
verifying whether the user is the person in question or not using a function for determining the authenticity of the authentication result;
in response to verifying the user is the person in question, generating a key pair, the generated key pair comprising a first key used to attach a signature and a second key used to verify the signature attached by the first key;
registering, in an associated manner, a key identifier that identifies the generated key pair and user identification information that identifies the user;
transmitting the generated first key to the authentication device used by the user; and
receiving a request related to authentication accepted from another authentication device to which the first key was transmitted by the controller and in which the first key has been set, the request comprising the key identifier;
responding to the request by transmitting the second key and the user identified information associated with key identifier; and
instructing that the another authentication device is to be validated based on the key identifier and the user identification information.

10. An authentication device management method performed by a computer, the authentication device management method comprising:
receiving an authentication result from an authentication device, the authentication device locally performs personal authentication of a user to obtain the authentication result;
verifying whether the user is the person in question or not using a function for determining the authenticity of the authentication result;
in response to verifying the user is the person in question, generating a key pair, the generated key pair comprising a first key used to attach a signature and a second key used to verify the signature attached by the first key;
registering, in an associated manner, a key identifier that identifies the generated key pair and user identification information that identifies the user;
transmitting the generated first key to the authentication device used by the user; and
receiving, from an authentication server that is configured to verify the signature, a transmission request for the second key that is related to the authentication device to which the first key was transmitted and in which the first key has been set, the transmission request comprising the key identifier;
responding to the transmission request by transmitting, to the authentication server, the second key and the user identification information associated with the key identifier included in the transmission request;
managing, based on the key identifier and the user identification information, the validity of the first key transmitted to the authentication device and the second key transmitted to the authentication server.

11. A non-transitory computer-readable recording medium having stored therein authentication device management instructions performed by a computer, the instructions comprising:
receiving an authentication result from an authentication device, the authentication device locally performs personal authentication of a user to obtain the authentication result;
verifying whether the user is the person in question or not using a function for determining the authenticity of the authentication result;
in response to verifying the user is the person in question, generating a key pair, the generated key pair comprising a first key used to attach a signature and a second key used to verify the signature attached by the first key;
registering, in an associated manner, a key identifier that identifies the generated key pair and user identification information that identifies the user;
transmitting the generated first key to the authentication device used by the user; and
receiving, from an authentication server that is configured to verify the signature, a transmission request for the second key that is related to the authentication device to which the first key was transmitted and in which the first key has been set, the transmission request comprising the key identifier;
responding to the transmission request by transmitting, to the authentication server, the second key and the user identification information associated with the key identifier included in the transmission request;
managing, based on the key identifier and the user identification information, the validity of the first key transmitted to the authentication device and the second key transmitted to the authentication server.

12. An authentication device management system comprising:
an authentication device management device;
an authentication device that performs personal authentication of a user; and
an authentication server that authenticates the identity of the user, wherein
the authentication device management device includes
a controller including a processor, the controller configured to perform,
receiving an authentication result from an authentication device, the authentication device locally performs personal authentication of a user to obtain the authentication result;

verifying whether the user is the person in question or not using a function for determining the authenticity of the authentication result;

in response to verifying the user is the person in question, generating a key pair, the generated key pair comprising a first key used to attach a signature and a second key used to verify the signature attached by the first key, registering, in an associated manner, a key identifier that identifies the generated key pair and user identification information that identifies the user, and transmitting the generated first key and the key identifier tothe authentication device used by the user, the authentication device includes another controller including a processor, the another controller configured to perform, when personal authentication of the user is performed locally at the authentication device by an authentication method, setting the first key, transmitted by the authentication device management device, as a key for attaching a signature associated with the authentication method and that exhibits the key identifier, and requesting the authentication server to validate the authentication method to be performed by using the first key, and the authentication server includes an authentication server controller including a processor, the authentication server controller configured to, in response to receiving the request from the authentication device based on the setting, perform exhibiting the key identifier, and requesting, from the authentication device management device, transmission of the generated second key associated with the generated first key, the transmission request comprising the key identifier, and the controller of the authentication device management device is further configured to perform responding, in response to the transmission request for the generated second key from the authentication server, by transmitting, to the authentication server, the generated second key and the user identification information associated with the key identifier included in the transmission request.

* * * * *